United States Patent
Thomas et al.

(10) Patent No.: US 12,238,302 B2
(45) Date of Patent: *Feb. 25, 2025

(54) SYSTEM AND METHODS FOR VIDEO ENCODING AND DECODING

(71) Applicants: Koninklijke KPN N.V., Rotterdam (NL); Nederlandse Organisatie voor Toegepast-Natuurwetenschappelijk Onderzoek TNO, 's-Gravenhage (NL)

(72) Inventors: Emmanuel Thomas, Delft (NL); Omar Aziz Niamut, Vlaardingen (NL); Robert Koenen, Rotterdam (NL)

(73) Assignees: Koninklijke KPN N.V., Rotterdam (NL); Nederlandse Organisatie voor Toegepast-Natuurwetenschappelijk Onderzoek TNO, 's-Gravenhage (NL)

( * ) Notice: Subject to any disclaimer, the term of this patent is extended or adjusted under 35 U.S.C. 154(b) by 0 days.

This patent is subject to a terminal disclaimer.

(21) Appl. No.: 18/430,833

(22) Filed: Feb. 2, 2024

(65) Prior Publication Data
US 2024/0187608 A1 Jun. 6, 2024

Related U.S. Application Data

(63) Continuation of application No. 16/316,486, filed as application No. PCT/EP2017/066844 on Jul. 5, 2017, now Pat. No. 11,943,452.

(30) Foreign Application Priority Data

Jul. 14, 2016 (EP) ..................................... 16179530

(51) Int. Cl.
H04N 19/167 (2014.01)
H04L 69/04 (2022.01)
(Continued)

(52) U.S. Cl.
CPC ........... *H04N 19/167* (2014.11); *H04L 69/04* (2013.01); *H04N 19/174* (2014.11);
(Continued)

(58) Field of Classification Search
CPC ............... H04N 19/167; H04N 19/174; H04N 19/176; H04N 19/188; H04N 19/423;
(Continued)

(56) References Cited

U.S. PATENT DOCUMENTS

2012/0033039 A1 2/2012 Sasaki
2014/0092963 A1 4/2014 Wang
(Continued)

FOREIGN PATENT DOCUMENTS

CN 105637864 B 2/2019
JP 2014531178 A 11/2014
(Continued)

OTHER PUBLICATIONS

Chinese Office Action in Chinese, Patent Application No. 201780056540.3 dated Nov. 27, 2020.
(Continued)

*Primary Examiner* — Fabio S Lima
(74) *Attorney, Agent, or Firm* — McDonnell Boehnen Hulbert & Berghoff LLP

(57) ABSTRACT

A method is described for forming output video frames by a decoder device, comprising: receiving a bitstream comprising bitstream parts representing encoded media data of video tiles and tile positioning information associated with the encoded video tiles; extracting tile positioning information from the bitstream, the tile positioning information comprising tile identifiers for identifying encoded video tiles, a tile identifier being associated with one or more boundary identifiers, each identifying a boundary of a video tile identified by a tile identifier; determining a tile map
(Continued)

based on the boundary identifiers, the tile map representing a spatial layout of video tiles in an output video frame; and forming an output video frame, including identifying parts of the bitstream representing encoded media data of video tiles identified in the tile map, decoding the identified encoded media data and copying the decoded media data in the output video frame buffer according to spatial layout.

12 Claims, 11 Drawing Sheets

(51) Int. Cl.
*H04N 19/169* (2014.01)
*H04N 19/174* (2014.01)
*H04N 19/176* (2014.01)
*H04N 19/423* (2014.01)
*H04N 19/436* (2014.01)
*H04N 19/46* (2014.01)
*H04N 19/70* (2014.01)
*H04N 19/88* (2014.01)
*H04N 19/119* (2014.01)

(52) U.S. Cl.
CPC .......... *H04N 19/176* (2014.11); *H04N 19/188* (2014.11); *H04N 19/423* (2014.11); *H04N 19/436* (2014.11); *H04N 19/46* (2014.11); *H04N 19/70* (2014.11); *H04N 19/88* (2014.11); *H04N 19/119* (2014.11)

(58) Field of Classification Search
CPC ...... H04N 19/436; H04N 19/46; H04N 19/70; H04N 19/88; H04N 19/119; H04L 69/04
USPC .................................................... 375/240.26
See application file for complete search history.

(56) References Cited

U.S. PATENT DOCUMENTS

| | | | |
|---|---|---|---|
| 2014/0119671 A1 | 5/2014 | Lim | |
| 2014/0301464 A1* | 10/2014 | Wu | ...................... H04N 19/105 375/240.15 |
| 2015/0016540 A1 | 1/2015 | Rapaka | |
| 2015/0103920 A1 | 4/2015 | Rapaka | |
| 2016/0100196 A1 | 4/2016 | Wu | |
| 2016/0182927 A1* | 6/2016 | Denoual | ............ H04N 21/4728 725/109 |
| 2016/0198157 A1 | 7/2016 | Segall | |

FOREIGN PATENT DOCUMENTS

| | | | |
|---|---|---|---|
| JP | 2015529439 A | 10/2015 | |
| JP | 2016513916 A | 5/2016 | |
| WO | 2006112620 A1 | 10/2006 | |
| WO | 2011150128 A1 | 12/2011 | |
| WO | 2015197818 A1 | 12/2015 | |

OTHER PUBLICATIONS

Daguet, C. et al., "AVC Access Unit Definition", International Organization for Standardization, ISO/IEC JTC1/SC29/WG11, Coding of Moving Pictures and Associated Audio, Mar. 4, 2003, 8 pages.
European Search Report, European Patent Application No. 16179530.7, dated Sep. 30, 2016, 5 pages.
Hannuksela, Miska M. et al., "Coding of Parameter Sets", Joint Video Team (JVT) of ISO/IEC MPEG & ITU-T VCEG, Document JVT-C078, May 6-10, 2002, 14 Pages.
Indian Office Action for Application No. 201827049696 dated Aug. 13, 2020.
Lambert, P. et al., "Flexible Macroblock Ordering in H.264/AVC", J. Vis. Commun. Image, vol. 17, 2006, pp. 358-375.
Le Feuvre et al., "Support for Efficient Tile Access in the HEVC File Format", 104 MPEG Meeting; 22-4-13-Apr. 26, 12; D1 Incheon; (Motion Picture Expert Group or Iso/Iec JTC1/SC29/WG11), No. M29231, XP030057763.
PCT International Search Report and Written Opinion, PCT International Application No. PCT/EP2017/066844, dated Nov. 10, 2017, 23 pages.
PCT Invitation to Pay additional Fees and Annex to Form PCT/ISA/206, Communication Relating to the Results of the Partial International Search, PCT International Application No. PCT/EP2017/066844, dated Sep. 4, 2017, 18 pages.
Schierl, T., et al., "Slice Prefix for Sub-Picture and Slice Level HLS Signaling", Joint Collaborative Team on Video Coding (JCT-VC) of Itu-T Sg 16 WP 3 and Iso/Iec Jtc 1/SC 29/WG 11, Jul. 11-20, 2012, 12 pages.
Sullivan, Gary J. et al., "Overview of the High Efficiency Video Coding (HEVC) Standard", IEEE Transactions on Circuits and Systems for Video Technology, vol. 22, No. 12, Dec. 2012, pp. 1649-1668.
Wang, Ye-Kui, "AHG9: Signaling of Regions of Interest and Gradual Decoding Refresh", Joint Collaborative Team on Video Coding (JCT-VC) or ITU-T SG 16 WP 3 and IS/IEC JTC 1/SC 29/WG 11, Oct. 10-19, 2012, 4 pages.
Wiegand, Thomas et al., "Overview of the H.264/AVC Video Coding Standard", IEEE Transactions on Circuits and Systems for Video Technology, vol. 13, No. 7, Jul. 2003, pp. 560-576.
Ye et al., "SEI Message: Independently Decodable Regions Based on Tiles", Joint Collaborative Team on Video Coding (JCT-VC) of ITU-T SG 16 WP 3 and ISO/IEC JTC 1/SC 29/WG 11, Apr. 18-26, 2013. (Year: 2013).
Ye, Yan et al., "SEI Message: Independently Decodable Regions Based on Tiles", Joint Collaborative Team on Video Coding (JCT-VC) of ITU-T SG 16 WP 3 and ISO/IEC JTC 1/SC 29/WVG 11, Apr. 18-26, 2013, 8 pages.

* cited by examiner

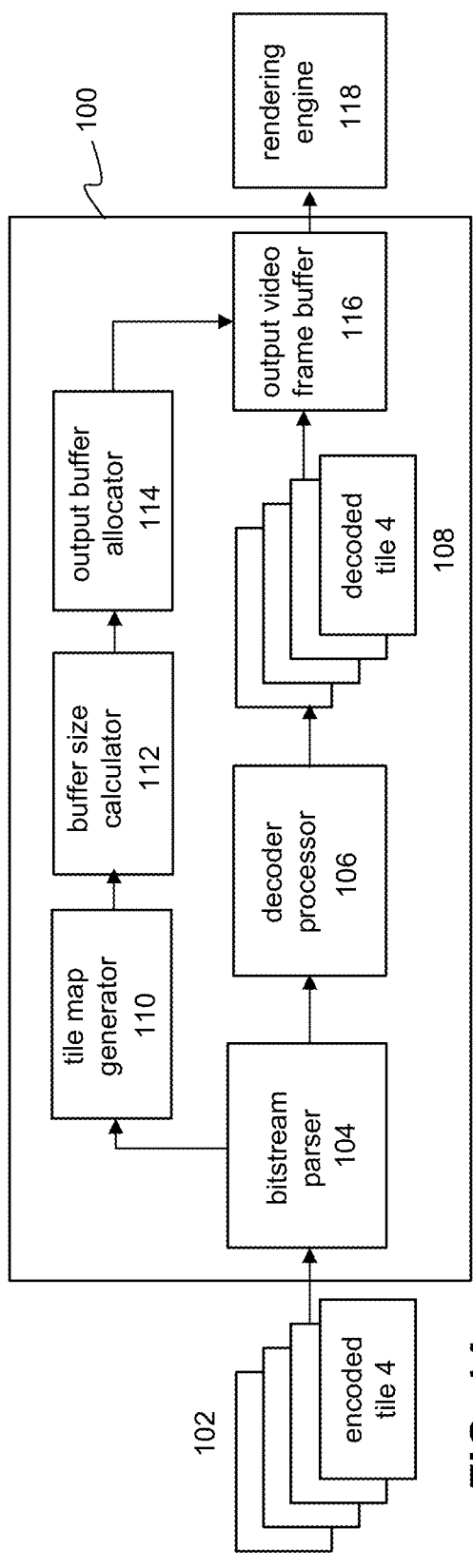
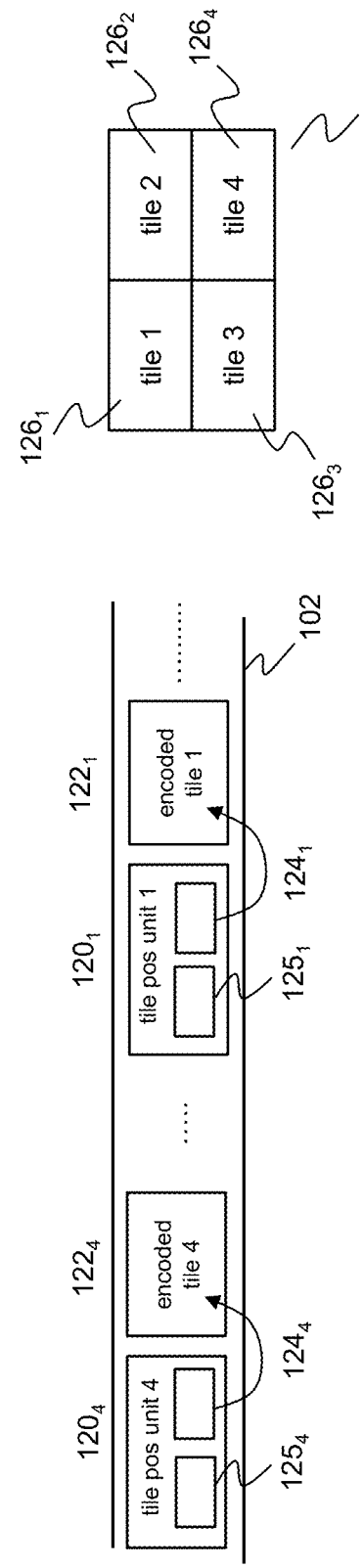
FIG. 1A
FIG. 1B
FIG. 1C

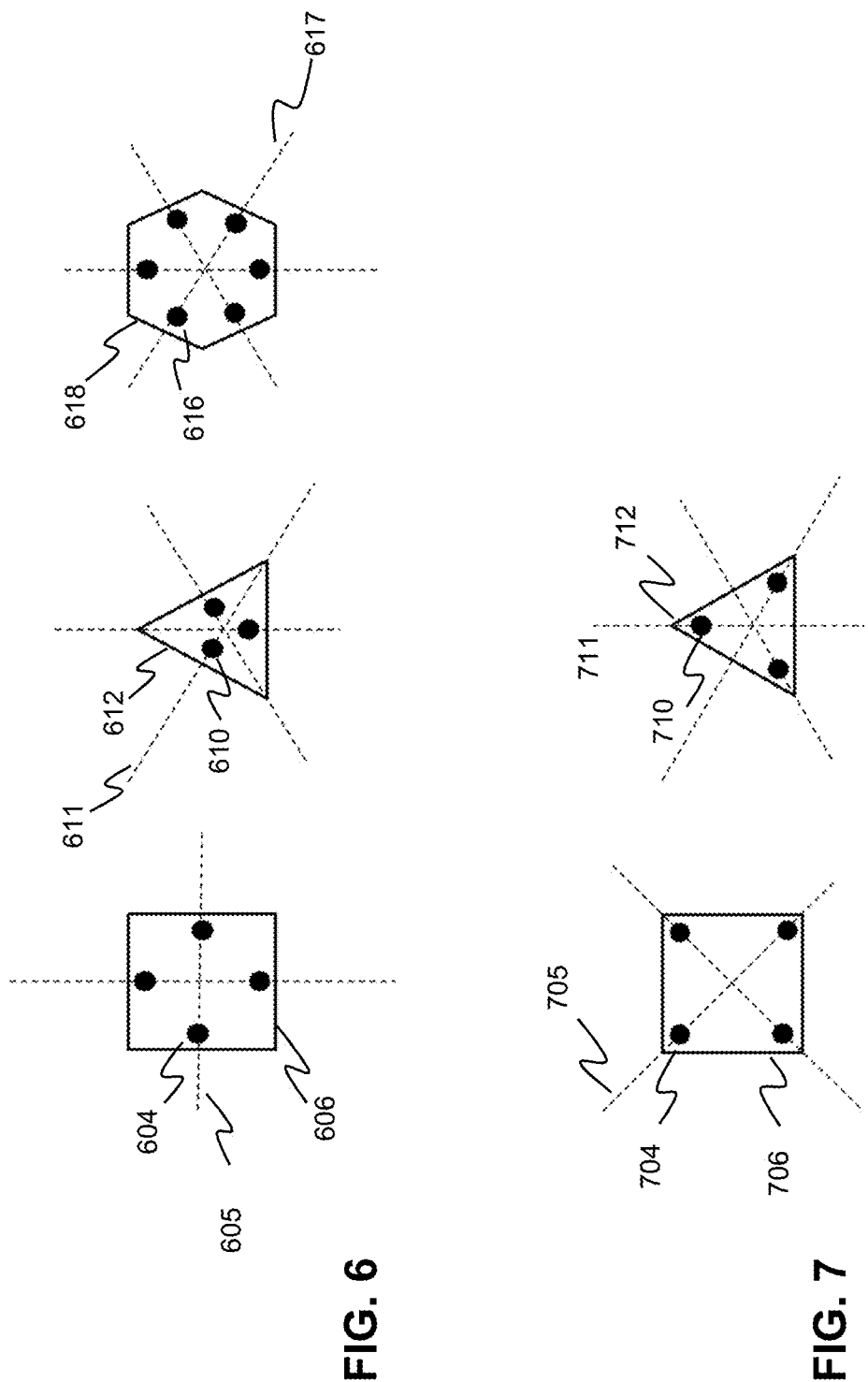

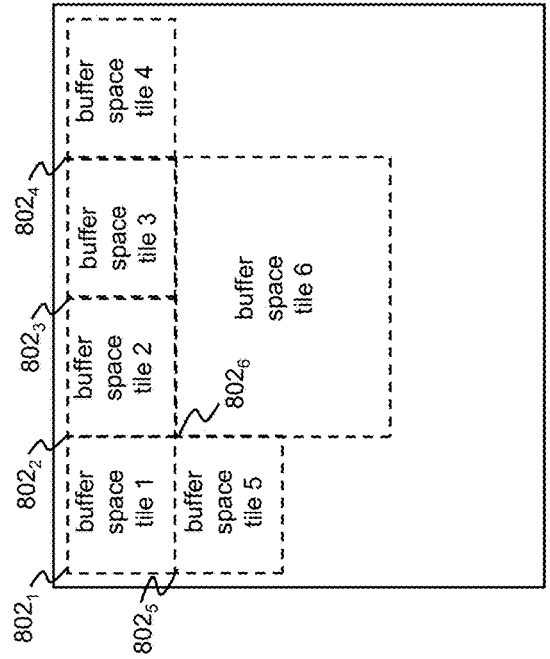
FIG. 8B
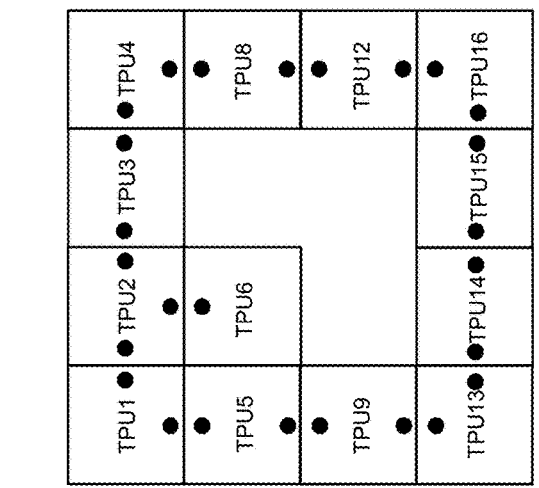
FIG. 8A
FIG. 8D
FIG. 8C

SYSTEM AND METHODS FOR VIDEO ENCODING AND DECODING

CROSS-REFERENCE TO RELATED APPLICATIONS

The present application is a continuation of, and claims priority to, U.S. application Ser. No. 16/316,486, filed Jan. 9, 2019, which is a national stage entry of, and claims priority to, PCT/EP2017/066844, filed on Jul. 5, 2017, which claims priority to European Patent Application EP 16179530.7, filed in the European Patent Office on Jul. 14, 2016, all three of which preceding applications are hereby incorporated in their entireties herein by reference.

FIELD OF THE INVENTION

The invention relates to video coding, and, in particular, though not exclusively, to methods of processing a bitstream by a decoder, methods of forming a bitstream by an encoder, a decoder device for processing a bitstream, an encoder device for forming a bitstream and a computer program product for executing such methods.

BACKGROUND OF THE INVENTION

Media devices capable of decoding video may be equipped with one or more hardware video decoders. In case the processor of the media device supports multi-core functionality some level of parallelism may be realised for a single decoder device provided that the bitstream is formatted on the basis of a codec that supports such functionality. For example, the HEVC/H.265 standard supports so-called HEVC tiles and wavefront parallel processing which enable the processing of video data to be distributed over the different processor cores.

An increasing number of media devices however nowadays support multiple decoder instances, often in the form of multiple hardware decoders or one software decoder and one hardware decoder instance. For example, consumer grade computers are nowadays equipped with CPUs that comprise a GPU (Graphical Processing Unit) in addition to a dedicated GPU embedded in a graphical card. These graphical cards are for instance manufactured by NVIDIA or ATI which are the major actors in this industry. However, both types of GPU (in CPU or in dedicated graphical card) have hardware video decoder capability (e.g. MPEG-4 part 10 AVC/H.264 and HEVC/H.265 for some of them). In order to fully exploit the potential of multiple decoder instances, the bitstream should be logically decomposed (split) into separate bitstreams that are supplied to the different decoders. State of the art video coding standards such as HEVC however are not designed to support a high-level parallelisation architecture allowing flexible decomposition of the input bitstream into different bitstreams. These different bitstreams being processed by different decoder instances.

In addition to the increased hardware capabilities, the resolution of videos is rapidly increasing from 4K to 8K and more in the future. In such scenarios, it would be desirable that the bitstream can be easily decomposed into separate bitstreams associated with different regions of interests of the video frames of the original bitstream.

Flexible decomposition of the bitstream in bitstreams representing different regions of interests largely depends on the way the bitstream is structured. For example, if one would like to extract information on HEVC tiles in an HEVC bitstream, the syntax of the bitstream needs to be analyzed up to its lowest level. In particular, it would require the parsing and analysis of the network abstraction layer (NAL) units, the VCL NAL units carrying video data and non-VCL units comprising metadata associated with the video data. Additionally, it would require the parsing and analysis of the slice segment data in the payload of VCL NAL units on the basis of the tile grid information in the so-called PPS non-VCL unit associated with VCL NAL units.

Furthermore, in order to isolate video data of a particular video tile, spatial and temporal decoding dependencies should be constrained within tile boundaries. However, it would be an extremely difficult task for a bitstream parser to infer whether temporal dependencies are effectively constrained to tiles boundaries over successive frames. Indeed, this would require to decode all the motion vectors in order to determine whether these motion vectors between two frames start and end in two tiles at the same position on the two frames.

In addition, the payload of each HEVC tile does not constitute a valid HEVC bitstream (e.g. one that could be decoded by a HEVC decoder complying with the HEVC standard) since the mandatory SPS and PPS NAL units would be missing.

In other words, for a decoder to decompose an HEVC bitstream real-time into multiple bitstreams wherein each bitstream represents a video tile in the video frames of the output video, and wherein each bitstream can be processed by a separate decoder, would in practice be very difficult and require a prohibitively large amount of resources.

Hence, there is a need in the art for improved coding schemes that allow flexible decomposition of a video bitstream into a plurality of bitstreams that can be individually processed in parallel by a plurality of video decoder instances so that high-level parallel bitstream processing may be achieved.

SUMMARY OF THE INVENTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The embodiments in this disclosure define coding schemes and bitstream formats wherein the encoded video data in the bitstream are organized in video tiles and wherein a decoder apparatus may form output video frames on the basis of a spatial arrangement of video tiles.

In an aspect, the invention may relate to processing a bitstream by a decoder apparatus comprising: receiving by the decoder apparatus a bitstream, the bitstream comprising a plurality of bitstream parts, a bitstream part comprising encoded media data associated with one or more video tiles, each video tile of the one or more video tiles representing a different region in an output video frame; receiving by the decoder apparatus tile positioning information comprising tile identifiers and boundary identifiers, a tile identifier identifying encoded media data belonging to a video tile, the tile identifier being associated with one or more boundary identifiers, a boundary identifier identifying at least one boundary of the video tile identified by the tile identifier; determining a tile map on the basis of the tile identifiers and boundary identifiers, the tile map defining a spatial layout of one or more video tiles in the output video frame; and, generating an output video frame on the basis of decoded media data of one or more video tiles and the tile map.

Hence, bitstream parts representing encoded media data of video tiles are processed on the basis of tile position information for signalling a decoder about relative positions of video tiles with respect to other video tiles in an output video frame. The relative positions of the video tiles in an output via frame are determined on the basis of one or more boundary identifiers that may signal the decoder whether two tiles have neighbouring boundaries (e.g. when a first boundary identifiers of a first video tile matches or has a predetermined relation with a second boundary identifier of a second video tile). Information on the spatial arrangement (layout) of the vide tiles in an output video frame (a tile map) can formed by identifying video tiles that have neighbouring boundaries. The tile map enable a decoder to efficiently compose an output video frame in the output video frame buffer on the basis of decoded media data of video tiles.

In an embodiment, the encoded media data of a video tile may be independently decodable. Here, the term independently decodable means that no decoding dependencies exist between media data of different video tiles so that encoded video data of one video tile can be decoded without the need of video data of other video tiles. This way, the encoded media data of the video tiles may be processed independently by different decoder instances that may run in parallel.

In an embodiment, generating an output video frame may comprise: the decoder apparatus extracting bitstream parts from the bitstream and providing different bitstream parts to different decoder instances.

In an embodiment, generating an output video frame may comprise: the decoder apparatus providing at least a first bitstream part comprising encoded media data of at least a first video tile to a first decoder instance and at least a second bitstream part comprising encoded media of at least a second video tile to a second decoder instance, wherein the first video tile is different from the second video tile; the first and second decoder instances decoding at least part of the at least first bitstream part and at least part of the at least second bitstream part into decoded media data.

In an embodiment, at least part of the media data of the first video tile by the first decoder instance and media data of the second video tile by the second decoder instance may be decoded in parallel. Hence, media data of at least part of the extracted bitstreams parts are decoded in parallel into decoded media data by different video decoder instances.

In a further embodiment, the method may include positioning the decoded media data in an output video frame buffer of the decoder apparatus according to the spatial layout defined by the tile map.

In an embodiment, the generating an output video frame may comprise at least one of: parsing the bitstream in order to identify one or more bitstream parts in the bitstream that belong to an output video frame; extracting identified bitstream parts out of the bitstream and providing the extracted bitstream parts to different video decoder instances.

The invention thus enables flexible bitstream decomposition (e.g. decomposition into bitstream parts wherein each bitstream part represents an encoded video tile) in the coded domain that does not impact the decoding process. Such bitstream decomposition allows the decoder apparatus the different bitstream parts (video tiles) to be processed independently, in parallel or at least partly in parallel, by different decoder instances. For example, different hardware decoders, e.g. GPUs, or a processor, e.g. hardware or software decoder (or a combination thereof), that are configured to execute multiple decoder instances in parallel.

The invention enables a bitstream parser of a decoder apparatus to process a bitstream comprising bitstream parts representing encoded media data of video tiles. The decoder apparatus may use the tile positioning information associated with the encoded video tiles to determine a spatial arrangement of video tiles (a tile map) for configuring an output video frame buffer on the basis of the tile map and for spatially arranging decoded video tiles in the output video frame buffer on the basis of the information in the tile map.

The tile positioning information of the video tiles in the bitstream may signal the decoder the relative position of tiles in an output video frame. The relative positions of these tiles are expressed using a coordinate-less scheme. In particular, the tile position information in the video stream defines the position of the tiles relative to each other whereas the position of the tiles in the output frame are absolute positions. Such absolute position may e.g. be expressed in pixel unit coordinates.

In an embodiment, the tile positioning information may be comprised in the bitstream. In an embodiment, receiving tile positioning information may further include extracting tile positioning information from the bitstream. In other embodiment, (at least part of) the tile positioning information may be preconfigured with the decoder or provided to the decoder in a separate communication channel when the decoder is activated.

In an embodiment, the determining a tile map may include: determining whether a first video tile and second video tile have neighbouring boundaries on the basis of boundary identifiers.

In an embodiment, determining a tile map may include: determining whether a first video tile and a second video tile have neighbouring boundaries on the basis of their respective boundary identifiers; preferably a first video tile and a second video tile having neighbouring boundaries if a predetermined relation between a boundary identifier of the first video tile and a boundary identifier of the second video tile exists. In an embodiment, the predetermined relation between the first boundary identifier and second boundary identifier may include at least part of the first boundary identifier matching at least part of the second boundary identifier. Hence, the tile map may be determined by spatially arranging vide tiles that have neighboring boundaries.

In an embodiment, the tile positioning information may further comprise orientation information, the orientation information linking at least one boundary of a video tile with an orientation in a reference space of the output video frame buffer. In an embodiment, the orientation information may include at least one orientation identifier associated with at least one boundary identifier, wherein the orientation information enables a decoder apparatus to align a predetermined boundary of a video tile, e.g. a rectangular video tile, with a predetermined boundary of a rectangular output video frame buffer.

The orientation information may enable the decoder device to copy decoded media data of a video tile in the output video frame buffer so that the video tile has a predetermined orientation in the reference space of the buffer. For example, the north boundary of a rectangular vide tile may be aligned with the north boundary of a rectangular buffers space in the output video frame buffer In an embodiment, the video output buffer may be associated with a coordinate system, the coordinate system including least a first and second axis. The tile positioning information may further comprise orientation information for signaling the decoder apparatus to arrange at least one boundary of a video tile in the output video frame buffer in a predetermined orientation with respect to said first and/or second axis of said coordinate system. In this embodiment, a coordinate system, e.g. a 2D coordinate system including an origin, an x axis and an y axis may be used to determine the location for a video tile in the output video frame buffer. One boundary identifier of a video tile may be associated with orientation information, e.g. an orientation identifier, for signaling that the thus identified boundary should be oriented in a predetermined way, e.g. parallel or perpendicular, with respect to one of the axis (e.g. the x axis or the y axis).

In an embodiment, the bitstream may comprise meta-frames, a meta-frame comprising bitstream parts in the bitstream comprising encoded media data of video tiles forming a single output video frame.

In an embodiment, the start and/or end of a meta-frame in the bitstream may be determined by the decoder apparatus one the basis of one or more meta-frame delimiters in the bitstream.

In another embodiment, the start and/or end of a meta-frame in the bitstream may be determined by the decoder apparatus on the basis of one or more meta-frame order counters.

In an embodiment, a meta-frame delimiter or a meta-frame order counter may be formatted as one or more Network Abstraction Layer, NAL, units in the bitstream.

In an embodiment, at least part of the tile positioning information is contained in the bitstream. In another embodiment, at least part of the tile positioning information is contained in one or more tile positioning units in the bitstream, a tile positioning unit being a non-Video Coding Layer, non-VCL, NAL unit, comprising a tile identifier identifying a video tile and one or more boundary identifiers for identifying one or more boundaries of the video tile the tile positioning unit refers to.

In an embodiment, determining a tile map may comprise extracting tile positioning information of video tiles forming a single output video frame from the bitstream and identify neighboring video tiles on the basis of boundary identifiers in the extracted tile positioning information.

In an embodiment, the one or more tile positioning units may be configured for enabling a decoder instance to determine one or more further NAL units in the bitstream, the one or more further NAL units being Video Coding Layer, VCL, NAL units and comprising encoded media data of one or more video tiles. Hence, a tile positioning NAL unit may comprise information for identifying one or more VCL NAL units comprising encoded media data of a video tile that is associated with the tile positioning unit.

In an embodiment, the bitstream is formatted as an HEVC bitstream or an extension thereof.

In an embodiment, at least part of the tile positioning information may be contained in one or more Supplemental Enhancement Information, SEI, messages. In an embodiment, the SEI message are embedded in the bitstream. In an embodiment, the one or more SEI messages may comprise one or more tile identifiers and/or one or more boundary identifiers. Hence, instead of or in addition to tile positioning units, the tile positioning information may also be signaled to the decoder as SEI messages.

In an embodiment, at least part of the tile positioning information and/or the encoded media data may be contained in NAL units in the bitstream, wherein at least part of the NAL units comprises a NAL unit header, the NAS unit header comprising information for signaling a decoder apparatus to which video tile the NAL units belongs.

In an embodiment, wherein generating an output video frame may include: allocating a first buffer space in the output frame buffer for storing decoded media data of a first video tile and a second buffer space neighboring the first buffer space in the output frame buffer for storing decoded media data of a second video tile.

In an embodiment, the position of the allocated buffer space may be determined on the basis of the tile positioning information; and/or, the size of the buffer space of the video tile being determined on the basis of video tile size information in the bitstream.

In an embodiment, at least one of a tile positioning unit is configured as an offset tile positioning unit for creating an offset between two video tiles in the output video frame. In an embodiment, an offset tile positioning unit does not comprise a reference to media data in the bitstream.

In a further aspect, the invention may relate to a method of forming a bitstream by a video encoder apparatus.

In an embodiment, the method may include: encoding media data of one or more video tiles for an output video frame into one or more bitstream parts, each bitstream part being associated with a video tile and each video tile being associated with a tile identifier; determining a tile map representing a spatial layout of video tiles by associating each encoded video tile with a position in the output video frame; determining tile positioning information comprising the tile identifiers of the video tiles and one or more boundary identifiers associated with each video tile, wherein the boundary identifiers are configured to identify neighboring video tiles in the tile map; and, forming a bitstream, the bitstream comprising the bitstream parts representing the encoded media data of the one or more video tiles and tile positioning information associated with the one or more video tiles.

In an aspect, the invention may relate to a video decoding apparatus comprising: a computer readable storage medium having at least part of a program embodied therewith; and, a computer readable storage medium having computer readable program code embodied therewith, and a processor, preferably a microprocessor, coupled to the computer readable storage medium, wherein responsive to executing the computer readable program code, the processor is configured to perform executable operations comprising: receiving a bitstream, the bitstream comprising a plurality of bitstream parts, a bitstream part comprising encoded media data associated with one or more video tiles, each video tile of the one or more video tiles representing a different region in an output video frame, the encoded media data of a video tile configured for being independently decodable; receiving tile positioning information comprising tile identifiers and boundary identifiers, a tile identifier identifying encoded media data belonging to a video tile of a predetermined shape, preferably a rectangular shape, the tile identifier being associated with one or more boundary identifiers, a boundary identifier identifying at least one boundary of the video tile identified by the tile identifier; determining a tile map on the basis of the tile identifiers and boundary identifiers, the tile map defining a spatial layout of one or more video tiles in the output video frame; and, generating an output video frame on the basis of decoded media data of one or more video tiles and the tile map.

In further embodiments, the video decoding apparatus is adapted to perform any of the bitstream processing steps defined above.

In an aspect, the invention may relate to a video encoding apparatus comprising: a computer readable storage medium having at least part of a program embodied therewith; and, a computer readable storage medium having computer readable program code embodied therewith, and a processor, preferably a microprocessor, coupled to the computer readable storage medium, wherein responsive to executing the computer readable program code, the processor is configured to perform executable operations comprising: encoding media data of one or more video tiles for an output video frame into one or more bitstream parts, each bitstream part being associated with a video tile and each video tile being associated with a tile identifier; determining a tile map representing a spatial layout of video tiles by associating each video tile with a position in the output video frame; determining tile positioning information comprising the tile identifiers of the video tiles and one or more boundary identifiers associated with each video tile, wherein the boundary identifiers are configured to identify neighboring video tiles in the tile map; forming a bitstream, the bitstream comprising the bitstream parts representing the encoded media data of video tiles and tile positioning information associated with the video tiles.

In further embodiments, the video encoding apparatus is adapted to perform any of the bitstream formation steps defined above.

The invention described in this disclosure may also be used to describe the relative position of video tiles of a tiled video which may be used in the context of streaming spatially tiled videos using an HTTP adaptive streaming protocol such as MPEG DASH.

In that case, video frames of a source video file may be spatially divided in tiles according to a tiling arrangement and the video data associated with different tiles may be stored as different files on a storage medium, e.g. a server. A client device (e.g. an HTTP adaptive streaming client) may be configured to request the server to transmit (stream) video data as different tile streams to the client and to process the video data of the tile streams into output video frames for display.

A so-called manifest file may be used in order to signal the client device about the spatial relation between the different tile streams. For example, the spatial relation of a 2×2 tile mosaic formed by four (or more) tile streams can be defined in a manifest file so that the client is able to request the tile streams and to process the video data of the tile streams accordingly. In an embodiment, the manifest file may be an Media Presentation Description (MPD) as known from the ISO/IEC 23009 standard (the MPEG DASH standard).

In an embodiment, the existing Spatial Relationship Description (SRD) known from the MPEG DASH standard may be extended with a new scheme identifier describing a new coordinate system that is based on the boundary identifier scheme as described in this disclosure. This way, a HTTP adaptive streaming client such as a DASH client may be informed on the spatial relation of the tiles in the bitstream.

In an embodiment, the SupplementalProperty and/or EssentialProperty descriptors may be used to signal the DASH client that the bitstream supports video tiles which are arranged on the basis of boundary identifiers. In an embodiment, the @schemeIdUri may be set to "urn:mpeg: dash:srd:relative:4-connected:2016" in order to provide DASH client with relative spatial relationship information associated to the containing Spatial Object, here an AdaptationSet.

Hence, the above described manifest file may be stored on a non-transitory computer-readable storage media of a client device, wherein the client device is configured to process the video streams of each of the video tiles on the basis of the manifest file, wherein the manifest file comprises computer-readable data comprising a plurality of tile stream identifiers for identifying a plurality of tile streams, wherein each tile stream is associated with one or more boundary identifiers, wherein the one or more boundary identifiers of each of said tiles defined the positions of one tile relative to one or more other tiles defined in the manifest file.

The client device may use the information in the manifest file in order to request and process tile streams. In particular, a client device may use tile stream identifiers (e.g. URLs) in a manifest file to request one or more network nodes, e.g. one or more media servers, to transmit tile streams to the client device. The client device may use the SRD information in the manifest file to process the video data of the different tile streams. This processing may include the decoding of the media data of the different tile streams into video frames of the different tile stream and stitching the video frames of different tile streams (belonging to one presentation time instance) into an output video frame for display.

In some embodiments, video data may be encoded on the basis of a codec that supports spatial tiling. For example, the HEVC standard supports HEVC tiles wherein the video frames are spatially divided in a grid of tiles. These HEVC tiles are encoded such that each of the tiles can be processed by a different core of a microprocessor. The media data associated with an HEVC tile may be encoded such that they do not have any spatial decoding dependency on the media data of other tiles of the same video frame. Further, the media data associated with a tile are encoded such that they do not have any temporal decoding dependency on the media data of other tiles of earlier or future video frames. In that case, the video data of each HEVC tile may be stored as HEVC tile tracks, i.e. HEVC tile files, on a media source. These tile tracks may have a data container format based on ISO/IEC 14496-12 ISO Base Media File Format (ISOBMFF) or ISO/IEC 14496-15 Carriage of NAL unit structured video in the ISO Base Media File Format. In that case, the content processing device should comprise an HEVC client that supports tiles which can decode the requested HEVC tile streams into a single video frame.

The invention may also relate to a computer program product comprising software code portions configured for, when run in the memory of a computer, executing the method steps according to any of process steps described above.

The invention will be further illustrated with reference to the attached drawings, which schematically will show embodiments according to the invention. It will be understood that the invention is not in any way restricted to these specific embodiments.

BRIEF DESCRIPTION OF THE DRAWINGS

FIG. 1A-1C depict schematics of a decoding system for decoding a tile-based bitstream according to an embodiment of the invention.

FIG. 6 depicts the concept of boundary identifiers associated with differently shaped tiles according to various embodiments of the invention.

FIG. 7 depicts the concept of boundary identifiers associated with differently shaped tiles according to various embodiments of the invention.

FIG. 8A-8D depict tile maps and an associated tiled output video frame according to an embodiment of the invention.

DETAILED DESCRIPTION

Figure 2C:
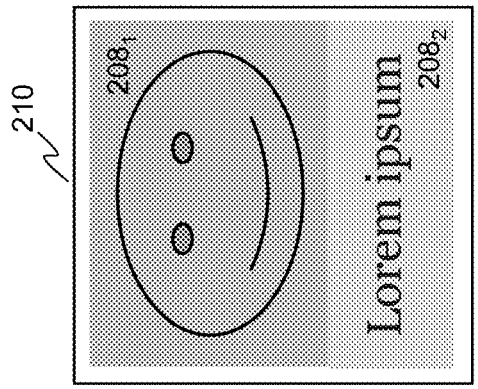
FIG. 2A-2C illustrate the formation of a tile map on the basis of the tile positioning information according to an embodiment of the invention.

The embodiments in this disclosure enable flexible bitstream decomposition, e.g. decomposition into bitstream parts representing an encoded video tile, in the coded domain that does not impact the decoding process. Such bitstream decomposition allows the different bitstream parts to be processed independently and in parallel by different decoder instances, e.g. different hardware decoders or a hardware decoder that is configured to executed multiple decoder instances in parallel.

In particular, the embodiments in this disclosure define coding schemes and bitstream formats wherein the encoded video data in the bitstream are organized in video tiles, e.g. region of interests. Each video tile is linked to metadata, including positioning information for signalling to the decoder the relative position of the video tile with respect to other video tiles in the output video frame buffer of the decoder. The relative position of the video tiles are described on the basis of one or more boundary identifiers that may signal the decoder whether two tiles have neighbouring boundaries (edges).

The coding schemes and the bitstream formats according to the invention enable a bitstream parser of a decoder: to parse a bitstream comprising bitstream parts representing encoded media data of video tiles and tile positioning information associated with the encoded video tiles, to extract tile positioning information of tiles that form an output video frame, to determine a tile map on the basis of the positioning information, to configure the output video frame buffer on the basis of the tile map, to decode encoded media data of the video tiles and to store decoded video tiles into the output video frame buffer on the basis of the information in the tile map.

Hence, the tile positioning information of the tiles in the bitstream may signal the decoder the relative position of tiles in an output video frame. The relative positions of these tiles are expressed using a coordinate-less scheme. In particular, the tile position information in the video stream defines the position of the tiles relative to each other whereas the position of the tiles in the output frame are absolute positions. Such absolute position may e.g. be expressed in pixel unit coordinates.

The relative positioning of neighbouring tiles in a tile map is enabled by introducing the concept of boundary identifiers that identify the boundaries of a tile. The boundary identifiers may be used to determine neighbouring tiles, i.e. tiles having neighbouring boundaries.

A sequence of bitstream parts may represent encoded media data of video tiles that are used to from an output video frame. Such sequence of bitstream parts in the bitstream may be referred to as a meta-frame. The position of meta-frames in the bitstream may be identified on the basis of one or more meta-frame delimiters.

FIG. 1A-1C depict schematics of a decoding apparatus for decoding a tile-based bitstream according to an embodiment of the invention. In particular, FIG. 1A depicts a decoder apparatus 100 comprising a bitstream parser 104, one or more decoder processors 106, and one or more buffers 108, 116 for buffering decoded video data. The decoder apparatus may further comprise a tile map generator 110, a buffer size calculator 112 and an output buffer allocator 114 for configuring the one or more output video frame buffers 116. The output of the output video frame buffer may be coupled to a rendering engine for displaying video frames to a user.

A tile-based bitstream 102 may be fed to the input of a bitstream parser 104. An example of a da such tile-based video bitstream is illustrated in more detail in FIG. 1B. The tile-based bitstream 102 may comprise bitstream parts, wherein each bitstream part may comprise encoded media data $122_{1-4}$ representing a video tile of an output video frame and associated tile positioning information $120_{1-4}$.

FIG. 1C depicts an example of a output video frame 128 that is generated by the decoder apparatus. A shown in this figure, the output video frame may comprise (in this case four) video tiles $126_{1-4}$ in one or more output frame buffers of the decoder apparatus. The video tile thus represents a region in an output video frame. A video frame comprising such video tiles may be referred to as a tiled video frame.

In an embodiment, each video tile may be associated with a tile positioning unit. Here, a tile positioning unit (TPU) may comprise a tile identifier $124_{1-4}$ or information for identifying a video tile in the bitstream so that the decoder is capable of linking at least one tile position unit to at least one video tile in the bitstream.

For example, the tile identifier $124_4$ in FIG. 1B may link the tile positioning unit 4 $120_4$ with an encoded video tile 4 $122_4$ in the bitstream. A tile position unit may further comprise one or more boundary identifiers $125_{1-4}$ for identifying one or more boundaries of a video tile as identified by the tile identifier in the tile positioning unit. In an embodiment, a boundary identifier may be associated with one boundary of a tile. In another embodiment, an boundary identifier may be associated with (at least) two boundaries of a tile that form a corner of a tile. In an embodiment, such a boundary identifier associated with two boundaries may be defined as a corner boundary identifier. Examples of boundary identifiers are described hereunder in more detail.

The boundary identifiers of the tile position unit are used by the decoder system in order to determine a tile map defining how the video tiles are positioned with respect to each other in a tiled output video frame.

Encoded video data of a video tile may be associated with video metadata, e.g. information regarding the resolution, color scheme and any other parameters that are needed by the decoder for decoding the video data of the video tile and form video frames on the basis of the decoded video data.

The bitstream may be formatted into logical data units such that the encoded media data of the video tiles and the tile positioning units may be parsed by the bitstream parser and so that specific information, e.g. tile positioning units and/or video data associated with one tile may be efficiently extracted from the bitstream. For example, in an embodiment, the bitstream may be formatted on the basis of so-called network abstraction layer (NAL) units. In particular, the video data may be formatted as VCL NAL units and the video metadata and the position unit may be formatted as non-VCL NAL units. Examples of such NAL units are described hereunder in more detail.

The bitstream parser may extract encoded video data of video tiles (in short "encoded video tiles") $124_{1-4}$ out of the bitstream and feed them to a decoder processor 106 that is configured to execute one or more decoder instances. In an embodiment, the decoder processer is a hardware decoder processor supporting execution of multiple decoder instances. For example, a hardware decoder processor may comprise multiple graphical processing units (GPUs). This way, encoded video data of different video tiles may be decoded by different decoder instances or graphical processing units.

In an embodiment, no decoding dependencies exist between different video tiles so that encoded video data of one video tile can be decoded without the need of video data of other video tiles. This way, the different decoding instances may decode the encoded video tiles in parallel so that a high decoding efficiency can be achieved.

The decoder processor may decode the encoded video tiles (four in this example) and (temporary) buffer (video data associated with) a decoded video tile 108 before it is copied into an output video frame buffer 116.

In an embodiment, each of the encoded video tiles may be decoded on the basis of a conventional decoding scheme.

Similarly, the bitstream parser may extract the tile positioning units associated with the video tiles and feed the tile positioning units $120_{1-4}$ to a tile map generator 110. The tile map generator may use the information the tile positioning units, e.g. a tile identifier and one or more boundary identifiers, to generate a so-called tile map, i.e. a spatial layout of video tiles in an output video frame.

The tile map may represent the spatial arrangement of the video tiles in the output video frames expressed in video sample units (e.g. pixel units). In other words, the tile map signals the decoder how the video tiles in the bitstream should be positioned with respect to each other when building the output video frames on the basis of the decoded tiles. In an embodiment, the video data of a video tile may include information (metadata) on the size of the video tile (in pixel units). Alternatively, and/or in addition, a tile positioning unit may comprise information (metadata) on the size of the video tile (in pixel units).

To that end, the tile map generator may define a spatial arrangement of video tiles on the basis of the boundary identifiers of different tile positioning units. For example, in an embodiment, the tile map generator may determine that boundaries of two video tiles, identified by their tile ID, are neighboring boundaries in case the boundary identifiers of these boundaries match. Boundary identifiers match in case both boundary identifiers meet a certain rule. For example, in an embodiment, the tile map generator may determine that if two tile positioning units comprise identical boundary identifiers, the two tiles have neighboring boundaries.

Additionally, based on the tile positioning units and/or metadata in the bitstream, a buffer size calculator 112 may determine the size of the output buffer. The size of the (empty) output buffer may be calculated by summing the requirements for buffer space for each tile in the tile map. The output buffer allocation information is generated so that the decoder may configure the buffer size such that the tiles can be stored in the output buffer on the basis of the tile map. This way, the buffer size information is used by an output buffer allocator 114 in order to allocate the output video frame buffer 116 in the buffer memory. Based on the tile map, decoded tiles 108 originating from the decoder processor are copied at a certain spatial position in the output video frame buffer 116. Thereafter, the decoder system may copy the decoded tiles that are identified in the tile map and that are decoded by the decoder processor into the output video frame buffer. Once the video data of all tiles identified in the tile map are copied into the output buffer (thus forming a tiled video frame), the decoder may signal a rendering engine 118 to display the tiled video frame 126 as shown in FIG. 1C.

It is submitted that FIG. 1A-1C only depicts one possible implementation of the buffer process. For example, in order to avoid the need of temporary buffers for each tile, each decoded tile may be immediately stored in the output buffer according to the tile map.

Figure 2B:
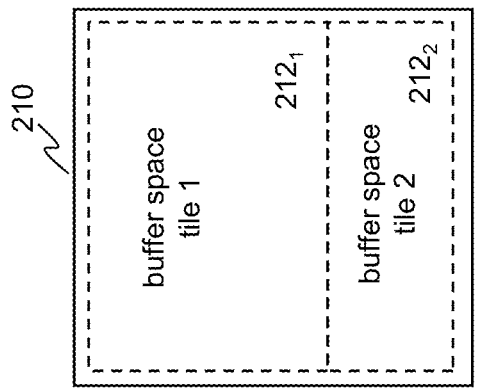
Figure 2A:
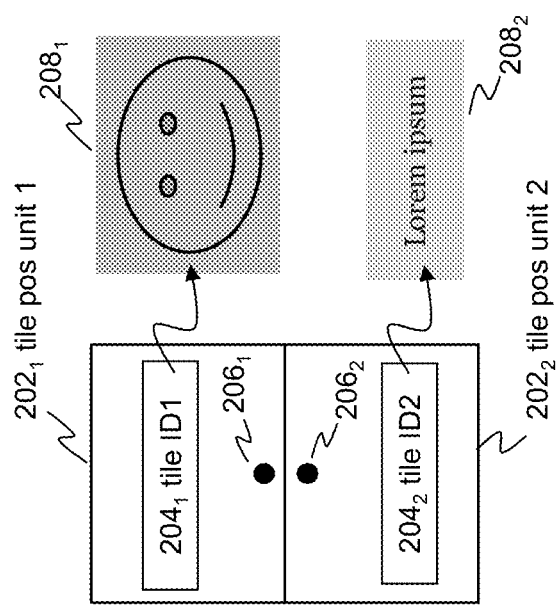

FIG. 2A-2C illustrate the formation of a tile map on the basis the tile positioning information according to an embodiment of the invention. In particular, FIG. 2A depicts two tile positioning units $202_{1,2}$, each comprising a tile identifier $204_{1,2}$ or information for linking the tile positioning unit to media data of a video tile. Further, the tile identifier may comprise a boundary identifier $206_{1,2}$ for identifying a boundary of a tile.

In FIG. 2A a boundary identifier is graphically illustrated as a dot positioned at the boundary of the (rectangular) tile positioning unit that is shaped in accordance with the (rectangular) shape of the video tile it refers to. Such boundary is identified by an (unique) boundary identifier value. For example, in FIG. 2A, the first tile positioning unit $202_1$ comprises a first tile identifier $204_1$ referring to a rectangular first video tile 208, and defines a first boundary identifier $206_1$ for the south boundary of the first video tile. Similar, the second tile positioning unit $202_2$ comprises a second tile identifier $204_2$ referring to a rectangular second video tile $208_2$ and defines a second boundary identifier $206_2$ for the north boundary of the second video tile.

The tile positioning units may be extracted from the bitstream and the tile map generator may determine that the first boundary identifier value of the first tile positioning unit matches the second boundary identifier value of the second tile positioning unit. Hence, because the tile positioning units share a common boundary identifier, the tile map generator is capable to determine that the output video frame comprises two neighboring video tiles, wherein the south boundary (boundary) of the first tile touches the north boundary (boundary) of the second tile. The buffer size calculator may further determine the size of the first and second video tile on the basis of metadata associated with the video data of the tiles. Based on the sizes of the first and second video tile the output buffer allocator may allocate an output buffer 210 that is sufficiently large so that output video frames can be constructed on the basis of the tile map.

Further, as shown in FIG. 2B, the tile map may divide the output buffer space in a first buffer space $212_1$ for the first video tile and a second buffer space $212_2$ for the second video tile. After decoding the video tiles, the decoded video data of each tile may be copied into the allocated buffer spaces in the output video frame buffer.

When copied into the allocated buffer space of the output video frame buffer, the video data form a meta-frame $208_{1,2}$ of the output video frame that is formed in the video frame buffer as shown in FIG. 2C. The bitstream may comprise meta-frame information for signaling the decoder which bitstream parts in the bitstream belong to a meta-frame.

The concept of tile positioning units and boundary identifier as illustrated in FIG. 2A-2C may be extended to any type of tiling arrangement based on any type of tile shape (e.g. hexagonal, triangular, etc.). Multiple boundary identifiers may be used in order signal more complex tiling arrangements (tessellations).

Figure 3:
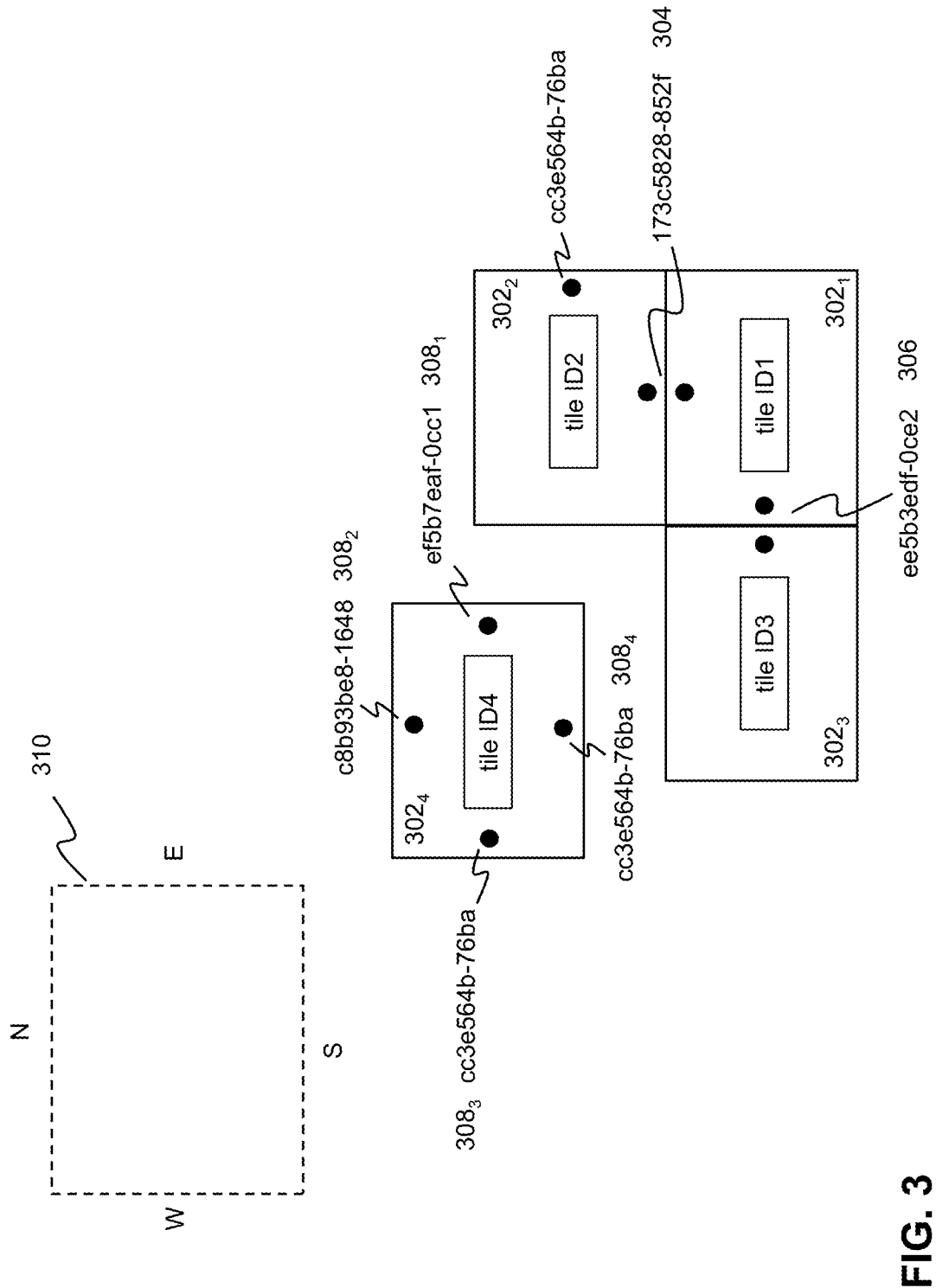
FIG. 3 schematically the formation of a tile map according to an embodiment of the invention.

FIG. 3 schematically the formation of a tile map according to an embodiment of the invention. In this example four tile positioning units $302_{1-4}$ are signalled in the bitstream. In the example of FIG. 3, the first tile positioning unit $302_1$ and the second tile positioning unit $302_2$ share the same boundary identifier value 137c5828-852f 304 thereby signalling the tile map generator that north boundary (boundary) of the first tile (the first tile positioning unit refers to) neighbours the south boundary (boundary) of the second tile (the second tile positioning unit refers to). In the same way, the first tile positioning unit 302, and the third tile positioning unit $302_3$ share the same boundary identifier value ee5b3edf-0ce2 306, thereby signalling that the west boundary of the first tile neighbours the eastern boundary of the third tile.

The fourth positioning unit $302_4$ comprises four defined boundary identifiers $308_{1-4}$ associated with four boundary identifier identifiers respectively. As shown in FIG. 3 none of these boundary identifiers matches boundary identifier identifiers of the first, second and third positioning units. As a result, there is no spatial relationship expressed between the fourth tile (the tile the fourth positioning unit refers to) and the other tiles. The final rendering of this scenario will be determined by considerations at the video application level. Assuming that a single screen is used to render the content associated with this tile map, different rendering possibilities may be possible for example:

discarding tile 4 and presenting tiles 1, 2 and 3;

discarding the tiles 1, 2 and 3 and presenting tile 4;

presenting tile 4 and tiles 1, 2 and 3 in such a way that tile 4 is isolated and displayed next to the other tiles.

In an embodiment, in order to speed up the generation of the tile map or to disambiguate the tile map when multiple combinations are possible on the basis of the tile positioning units, a boundary identifier may be associated with an orientation in the reference space (e.g. the output video buffer space). For example, as shown in FIG. 3, the output video buffer may define a rectangular reference space having sides which are identified by an orientation identifier (e.g. an identifier value identifying an orientation e.g. north, east, south and west. In that case, a tile positioning unit may comprise orientation information so that—when building a tile map—the tile positioning units can be positioned in the reference space on the basis of the orientation information.

For example, the boundary identifiers or at least one of the boundary identifiers of a tile positioning unit may be associated with an orientation identifier. Such orientation identifier may define an orientation e.g. south, east, north, west in the reference space of the tile map so that the decoder knows how to orient a rectangular video tile in an rectangular output buffer. A north boundary of a rectangular video tile may be aligned with a boundary of the rectangular reference space of the output video frame buffer.

This way an orientation identifier (e.g. an identifier defining a boundary as the north side of a tile) of associated with a boundary identifier enables a decoder to copy media data of a video tile in a particular orientation in the output video frame buffer.

A boundary identifier needs to be unique up to a certain point to prevent the collision of the boundary identifiers in the tile map. There are two parameters to consider; the scope (e.g. a frame, a group of frame, an entire video sequence, etc.) for which a boundary identifier is unique and how many boundary identifiers may be present in a given scope. Typically, the larger the scope and the more identifiers, the higher the uniqueness of the identifier must be. Based on this observation, table 1 provides some scenarios of suitable boundary identifiers wherein it is assumed that a tile map may comprise a maximum of 100 tile positioning units:

TABLE 1

Examples of boundary identifiers

| Scope of the boundary identifier | Suitable boundary identifier format | Example |
| --- | --- | --- |
| Meta-frame | 16 bit integer (65536 values) | 89 |
| Group of Pictures (~20 meta-frames) | 16 bit integer (65536 values) | 25446 |
| Encoded Sequence | uuid v4 (see RFC 4122 [4]) | 123e4567-e89b-12d3-a456-426655440000 |

When the number of boundary identifiers that need to be matched is significant, fast matching techniques may be applied. For instance, the first part of the boundary identifier (to be specified in the context) could identify a group of boundary identifiers such that the matching process can be accelerated.

Figure 4:
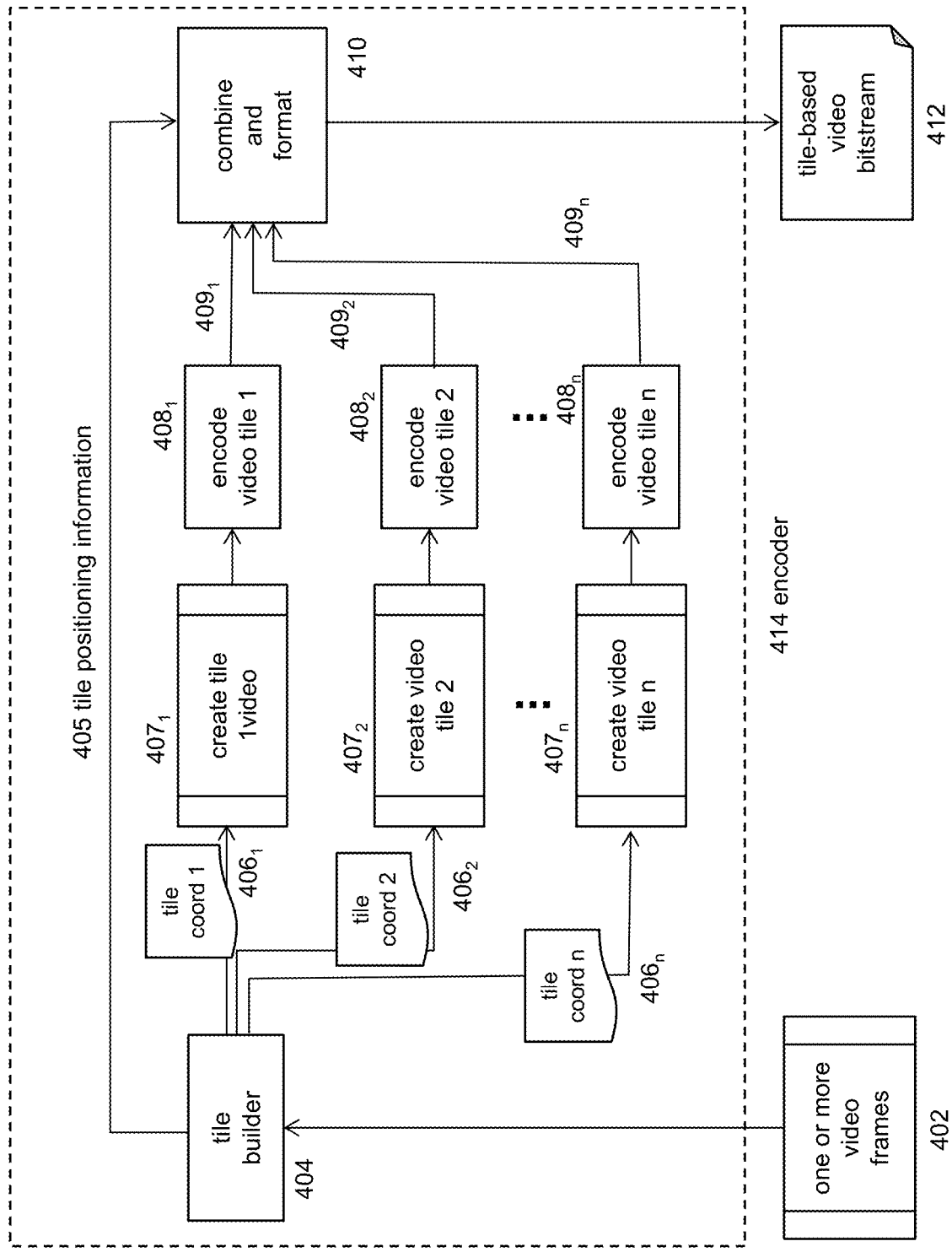
FIG. 4 depicts an example of an encoder apparatus according to an embodiment of the invention.

FIG. 4 depicts an example of an encoder apparatus according to an embodiment of the invention.

The encoding process may start with a video tile builder device 404 defining tile coordinates $406_{1-n}$ that may be used by a video tiling function that is configured to divide video frames of one or more source videos 402 into a plurality of video tiles $407_{1-n}$ (regions of interest). Video tiles may be selected in order to form a spatial arrangement of N video tiles of an output video frame. This way media data of N video tiles may be selected and fed into the input of an encoder apparatus. In an embodiment, the encoder apparatus may comprise a plurality of encoder processors or encoder instances. In an embodiment, the encoder apparatus may be configured to start N encoder instances, one for each video tile. In another embodiment, media data of at least a first set of video tiles are encoded by at least a first encoder instance and media data of at least a second set of video tiles are encoded by at least a second encoder instance.

The encoder processors $408_{1-n}$ may subsequently encode the media data (i.e. audio/video (AV) data of the video tiles into separate (N) bitstream parts, wherein each bitstream part represents an independently encoded video tile $409_{1-n}$ which may be temporarily stored in a buffer. Here, independently encoded means that there are no encoding dependences between the video data of different video tiles. In other words, the media data of one video tile can be decoded by a decoder instances without the need of media data of other video tiles.

The video data may be encoded using any known codec e.g. AVC, SVC, HEVC, VP9, etc. or future codec schemes. Further, the media data may be related to conventional 2D media data or omnidirectional video data as used in virtual reality applications. For example, a video tile may include video data related to an equirectangular projection of the omnidirection video data.

When generating the tile coordinates, the video tile builder device may determine the relative position of the video tiles with respect to each other on the basis of boundary identifiers of one or more boundaries of the video tiles building an output vide frame. The information describing the relative position may be referred to as tile position information and thus includes tile identifiers identifying video tiles and one or more boundary identifiers associated with video tile.

In an embodiment, (at least part of) the tile position information may be contained in tile positioning units, wherein a tile position unit is associated with a video tile comprising a tile identifier and one or more boundary identifiers. The tile positioning units of the video tiles in an output vide frame may be configured to form a tile map representing a spatial layout of video tiles in an output video frame as. e.g. explained above with reference to FIG. 1-3.

The tile position information may be forwarded to the bitstream aggregator 410, which combines (merges) the N bitstream parts and the tile position information into one tile-based video bitstream 412.

As will be described hereunder in more detail, the tile-based video bitstream may be formatted by the bitstream aggregator device on the basis of the tile position information such that a decoder device is able to identify the bitstream parts representing the different encoded video tiles in the bitstream and to efficiently extract the encoded video tiles out of the bitstream.

The tile position information, in particular the tile position units including a tile identifier and one or more boundary identifiers, may be defined in the bitstream at a relatively high level, e.g. at the NAL unit level (as e.g. used in the AVC or HEVC video coding standard), so that this information may be easy accessible for a bitstream parser of a decoder device. This way, a decoder device may easily extract the tile positioning units associated with an output video frame from the bitstream, built a tile map on the basis of the information in the tile positioning units and process (decode) the media data accordingly.

In order to generate tile positioning information, including tile positioning units that comprise boundary identifiers for describing the spatial relationship between tiles the tile positioning units are associated with, the tile builder may execute the following steps:

determining or receiving the layout of a tiled video frame;
determining tile coordinates for each tile of the tiled video frame;
determining tiles on the basis of one or more video frames of one or more video sources, each tile being associated with a tile identifier;
assigning one or more boundary identifiers to boundaries of one or more tiles of the tiled video frame;
providing a predetermined relation between a first boundary identifier of a first tile and a second boundary identifier of a second tile if the first and second boundaries are neighbouring boundaries;
forming tile positioning units associated with the tiles in a tiled video frame, a tile positioning unit comprising at least a tile identifier and one or more boundary identifiers of the tile identified by the tile identifier.

Figure 5:
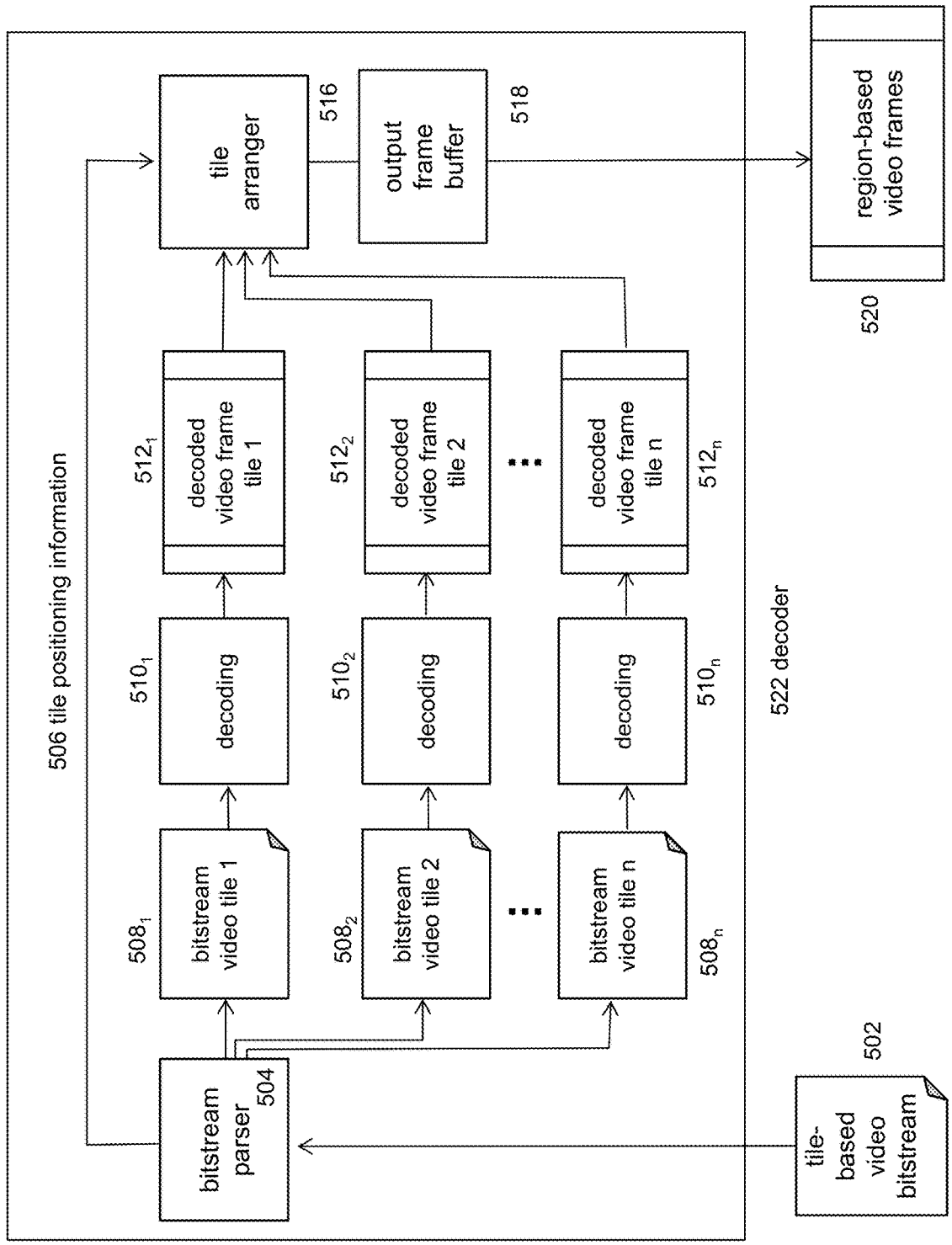
FIG. 5 depicts an example of a decoder apparatus according to an embodiment of the invention.

FIG. 5 depicts an example of a decoder apparatus according to an embodiment of the invention. The decoding apparatus may execute a decoding process that starts with the decoder apparatus receiving at an input a tile-based video bitstream 502 comprising video tiles and tile positioning information for positioning the video tiles relative to each other in an output video frame buffer. A bitstream parsing device 504 may parse the bitstream, i.e. analyse the syntax and structure of the bitstream (e.g. in terms of NAL units and meta-frames), and determine the number of video tiles in a meta-frame that are needed in order to form a (tiled) output video frame.

Then, the decoder apparatus may decompose the bitstream by splitting each the encoded media data of video tiles in a meta-frame into separate bitstream parts ("tile bitstreams"), wherein each bitstream part comprises encoded media data and associated metadata of a video tile. In particular, the bitstream partser may extract bitstream parts $508_{1-n}$ out of the bitstream and feed each of the bitstream parts to an input of decoder instance $510_{1-n}$. In an embodiment, media data of at least a first set of video tiles may be decoded by at least a first decoder instance and media data of at least a second set of video tiles may be decoded by at least a second decoder instance. Preferably, at least part of the bitstream parts is decoded in parallel by different decoder instances. A tile arranging device 516 may use the decoded video data of the video tiles $512_{1-n}$ to build a tiled output video frame in an output video buffer on the basis of the tile positioning information in a similar way as described with reference to FIGS. 1 and 2.

As shown in FIG. 5 the use of the tile positioning information allows efficient decomposition of the bitstream into separate independently decodable bitstreams representing video tiles that may processed in parallel by a plurality of decoder instances, e.g. one or more separate hardware GPUs, a GPU that is configured to executed multiple decoder instances or a combination of hardware and software decoders. In an embodiment, the decoder instances may implement conventional operations (inverse transform, signal prediction, motion compensation, etc.) of video coding standards, e.g. HEVC or the like. For example, using the tile position information the tile arranging device generate a tile map representing the spatial layout of the tiles relative to each other. The tile map be used by the tile arranging device to copy the decoded meta-frames into the output frame buffer. It is submitted that the functional elements of the encoder and decoder systems as described with reference to FIGS. 4 and 5 above may be implemented as an integrated device, e.g. as a microprocessor or a chip set. Alternatively, the functional elements may be implemented as separate or at least partly interacting devices. For example, the one or more encoding processes of the encoder system may be executed by one or more server systems. Similarly, different parts of the decoding system may be executed by different software and/or hardware applications that run on different devices.

Although the examples of tiles in this disclosure are defined in 2D space wherein a tile represents a polygon with boundaries and corners in a 2D plane, the invention is not limited thereto. In the most generic case, a tile may be a polytope that is defined by the tessellation of a N dimensional space. For example, in 3D, a "tile" may represent a cube or any polyhedron. In that case, neighboring tiles may be defined as two cubes that have neighboring surfaces. Hence, in that case an boundary identifier is associated with at least one surface of the tile. Further, tiles are not necessarily rectangular but could be of arbitrary shape, e.g. circular, octagonal, hexagonal, etc. . . . . In further embodiments, a tessellation of tiles may comprise differently shaped tiles.

FIG. 6 depicts examples of boundary identifiers for differently shaped tiles according to various embodiments of the invention.

A boundary 606,612,618 of a tile 602,608,614 may be associated with a boundary identifier 604,610,616 located on the line segment bisector 605,611,617 of a given boundary of the tile. In a boundary-to-boundary tiling (as in a regular tiling) neighbouring boundaries may be determined on the basis of a predetermined functional relation between the boundary identifiers of the neighbouring boundaries. For example, in an embodiment, the functional relation may be such that the tile identifiers of two neighbouring boundaries are identical.

FIG. 7 depicts examples of another type of boundary identifier which may be referred as corner boundary identifiers. For a corner 706,712 (which also may be referred to as a vertex) of a tile 702,706, the angle bisector 705,711 may be determined. The corner boundary identifier 704,710 is the boundary identifier located on this bisector angle inside the region of the tile. Hence, the corner boundary identifiers identify the boundaries (in the 2D case two boundaries) of a tile forming a corner of a tile.

Boundary identifiers may be used for defining neighbouring tiles regardless the selected tessellation, as two neighbouring tiles have at least one neighbouring boundary with one another. In some cases, however, corner boundary identifiers as depicted in FIG. 7 may also be used. A typical scenario for corner boundary identifiers is a description of a rectangle-shaped tile wherein one or more corner boundary identifiers of the corners of the tile may be used to describe diagonally neighbouring tiles that share a neighbouring corner. Unless specifically identified otherwise, in this disclosure the term boundary identifiers also includes corner boundary identifiers.

FIG. 8A-8D depict tile maps and an associated tiled output video frame according to an embodiment of the invention. In particular, FIGS. 8A and 8B illustrate two tile maps comprising multiple tile positioning units (TPUs) that are oriented with respect to each other on the basis of boundary identifier. These tile maps may define a spatial arrangement of video tiles of different sizes as shown in FIG. 8C. FIGS. 8A and 8B illustrate how such tile maps can be defined on the basis of tile positioning units comprising boundary identifiers.

As shown in FIG. 8A east-boundary of tile positioning unit 6 and the west-boundary of tile positioning unit 5, east-boundary of tile positioning unit 14 and west-boundary of tile positioning unit 9, and east-boundary of tile positioning unit 12 and west-boundary of tile positioning unit 15 are not defined as neighboring boundaries so that when this tile map is used by the decoder system to allocate buffer space in the output video frame buffer a lager sized buffer region for a large-sized (high resolution) video tile can defined that does not interfere with the other allocated buffer regions associated with the other video tiles.

For example, when using this tile map for allocating the buffer regions in the output video buffer, the tile positioning units may be processed in number order. Hence, as shown in FIG. 8B, starting with tile positioning unit 1, a buffer space 1 may be allocated in the output video frame buffer that has a size that matches the pixel size of the video tile the tile positioning unit 1 is referring to. Here, the left upright corner of the output buffer may be defined as the origin $802_1$ for the allocation of the meta-frame associated with the first tile positioning unit. Thereafter, tile positioning unit 2 may be processed, wherein the decoder system determines that the east-side boundary of video tile 1 neighbors the west-side boundary of video tile 2. In that case, the origin for buffer space $802_1$ may be translated in the east direction over a distance that matches the length of buffer space 1. Buffer space 2 may be allocated next to buffer space 1 and has the same size of buffer space 1. This process may be repeated for all other tile positioning units. As shown in FIG. 8B, when processing tile positioning unit 6, the decoder system will with allocate buffer space 6 at origin $802_1$. As video tile 6 has a neighboring boundary with video tile 2, the buffer space allocated for video tile 6 starts at the position just under the most bottom left position of the allocated buffer space for video tile 2 as depicted in FIG. 8B.

It is submitted that the sequence of the tile positioning units in the tile map may be processed in different ways. For example, it also possible to process the tile positioning units in raster scan order so that tile positioning units 13 and 16 will be processed after tile positioning unit 12.

Further, it is submitted that other tile maps can be used that lead to the same tiled output video frame. Another possible combination of boundary identifiers to define the video mosaic is depicted in FIG. 8B. Note that in this embodiment, there are no common boundary identifiers between tile positioning unit 9 and 14, between tile positioning unit 5 and 6 and between tile positioning unit 15 and 12. This implies that the tiles associated with these tile positioning units are not identified as neighbouring tiles. Hence, when allocating the buffer spaces in the output video buffer, these spaces will "slide" against each other as buffer region 6 is allocated so that it is able to store the video data of video tile 6.

In a further embodiment, one or more tile position units may be configured for creating an offset position between two video tiles. Such tile positioning unit may be referred to as an offset tile positioning unit. A more detailed example of such tile position units is described with reference to FIGS. 9A and 9B, which depict a tile map and an associated tiled output video frame according to an embodiment of the invention.

Figure 9B:
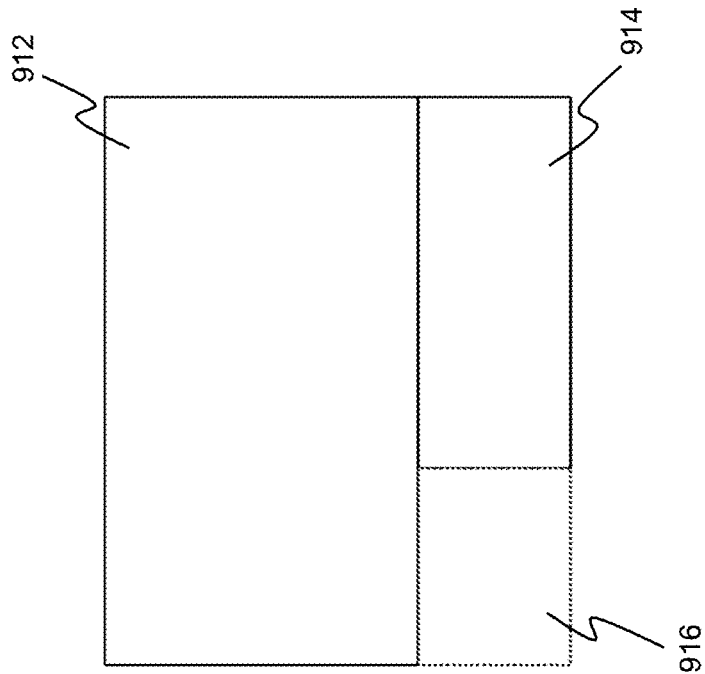
FIGS. 9A and 9B depict a tile map and an associated tiled output video frame according to an embodiment of the invention.

FIG. 9B depicts a final rendered tiled video frame comprising a video tile 912 (frame 2) that is arranged with an offset along a border of another video tile 914 (frame 1). The offset is represented by an offset area 916 in the output video frame. On the basis of conventions regarding neighbouring video tiles, it would appear that a video tile arrangement as depicted in FIG. 9B is not be possible. However, tile positioning units may be defined that are not associated with video data, i.e. actual video payload in the bitstream. Hence, an offset tile positioning unit may comprise information on the size of an offset area (in pixel units) so that the decoder can allocate a buffer space in the output video frame buffer for the offset area thereby obtaining the video frame arrangement of FIG. 9B.

Figure 9A:
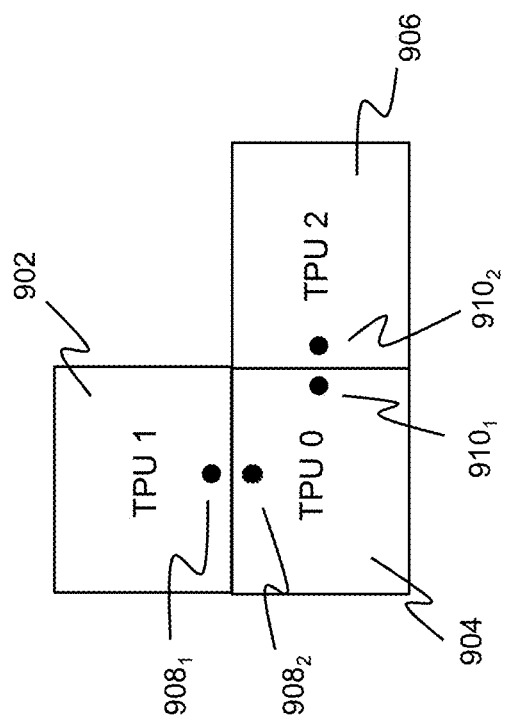

An example of a tile map describing a tiled video frame arrangement with an offset area is shown in FIG. 9A. As explained above, offset tile positioning unit 0 904 may be signalled in the bitstream with pixel dimensions that match the offset area so that a buffer space can be allocated but without linking the tile positioning unit to actual video data. In contrast, tile positioning unit 1 902 and tile positioning unit 2 906 each have neighbouring boundaries with tile positioning unit 0. Each neighbouring boundary is signalled by matching boundary identifiers $908_{1,2}$ and $910_{1,2}$. As a result, when processing the tile map of FIG. 9A, the decoder system may allocate buffer spaces that match the tile video frame 1 and 2 as shown in FIG. 9B. Here the bottom left part will be treated as "missing data" which will be translated for instance to pixels with a particular color such as green or black.

In an embodiment, a tile positioning unit may be rotated, e.g. a square tile positioning unit may be rotated over 90 degrees. When rotating a tile positioning unit, the corresponding video tile frame will be rotated as well.

Rotations of tile positioning units may be allowed or not allowed. If rotations are not allowed, only certain boundary identifier combinations are allowed, namely North/South (N/S) and East/West (E/W) for 4-connected rectangular tile system (i.e. based on boundary identifiers) and N/S, N-E/S-W, E/W, N-W/S-E for 8-connected rectangular tile system (i.e. based on boundary and corner boundary identifiers). All boundaries of the tile positioning units are parallel to, or at a straight angle with, all other tiles boundaries in the output video frame. Other boundary identifier combinations may be considered as not compliant data (e.g. not compliant bitstream in case of a bitstream-based signalling scheme).

If rotation is permitted, there is a need of signalling which tile positioning units need to rotate with respect to the other. As a result, the ability to rotate needs to be signalled for each tile positioning units. In an embodiment, all the tile positioning units may be considered to be anchored and an optional flag per tile may signal the ability to rotate. In another embodiment, the tile positioning units may be able to rotate and an optional flag per tile may signal the fact that the tile positioning unit does not rotate. In the 4-connected system, table 2 defines the rotations that may be signalled to the decoder by the corresponding neighbouring boundary associations:

TABLE 2

Rotations in a 4-connected system

|  | North | East | South | West |
|---|---|---|---|---|
| North | 180° | 90° | 0° | 90° |
| East | 90° | 180° | 90° | 0° |
| South | 0° | 90° | 180° | 90° |
| West | 90° | 0° | 90° | 180° |

In the 8-connected system, table 3 defines the rotations that may be signalled to the decoder by the corresponding neighbouring boundary associations:

TABLE 3

Rotations in an 8-connected system

|  | N | N-E | E | S-E | S | S-W | W | N-W |
|---|---|---|---|---|---|---|---|---|
| N | 180° | 45° | 90° | 135° | 0° | 135° | 90° | 45° |
| N-E | 45° | 180° | 45° | 90° | 135° | 0° | 135° | 90° |
| E | 90° | 45° | 180° | 45° | 90° | 135° | 0° | 135° |
| S-E | 135° | 90° | 45° | 180° | 45° | 90° | 135° | 0° |
| S | 0° | 135° | 90° | 45° | 180° | 45° | 90° | 135° |
| S-W | 135° | 0° | 135° | 90° | 45° | 180° | 45° | 90° |
| W | 90° | 135° | 0° | 135° | 90° | 45° | 180° | 45° |
| N-W | 45° | 90° | 135° | 0° | 135° | 90° | 45° | 180° |

When rotation is signalled, one of the two tile positioning units may be anchored and the other is able to rotate (otherwise the data is considered not compliant). When processing the tile map, a tile that is anchored (not able to rotate) may transmit this property to the neighbouring tile positioning units is attached to.

When the tile-map is composed, the final rotation angle for each tile positioning units is known. By convention, the top boundary (edge) of a video tile frame may be associated with the north boundary (edge) of a tile positioning units. Consequently, each tile in the final output frame is rotated over the same angle as their corresponding rotated tile positioning units.

For certain angles, for example 45° and 135°, the rotation of a tile requires the interpolation of the pixel values of the tile in the final rendered output video frame.

The invention may be implemented as an extension of the HEVC standard. The current HEVC video coding standard, ISO/IEC 23008-2, defines non-VCL NAL units to signal properties and characteristics of VCL NAL units comprising the multimedia data, e.g. audio-video (AV) data. The Video Coding Layer (VCL) NAL units is a collective term for NAL units that contain video samples or are considered as such by the HEVC standard.

Figure 10:
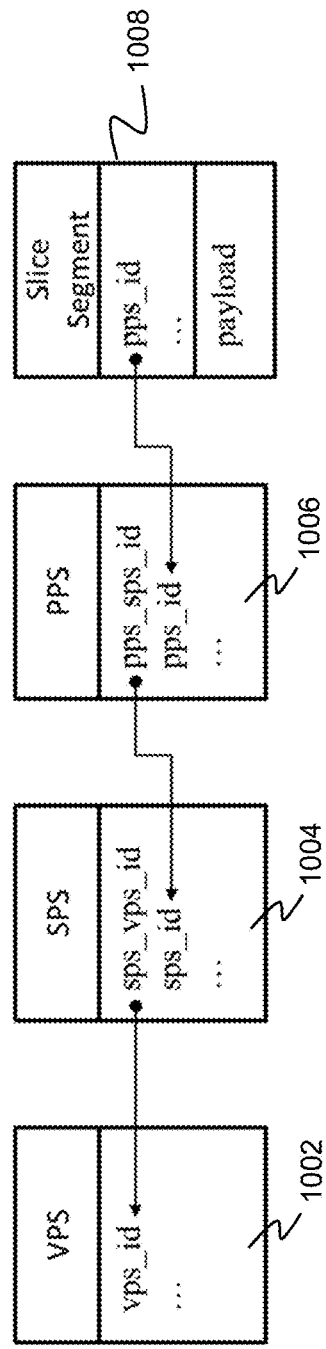
FIG. 10 depicts a schematic of the relationship between NAL units as used in an HEVC standard.

FIG. 10 depicts the relationship between the NAL units as e.g. used in the HEVC and AVC standard. Non-VCL NAL units include the metadata associated with the video data.

These non-VCL NAL units include the Picture Parameter Set (PPS) 1006, Sequence Parameter Set 1004 (SPS) and Video Parameter Set 1002 (VPS) where one PPS refers to one SPS which in turns refers to one VPS. The video data are contained in an VCL NAL unit which is referred to as a slice segment 1008. The video data in the slice segment are decoded on the basis of the information in the PPS, SPS and VPS it refers to.

Figure 11:
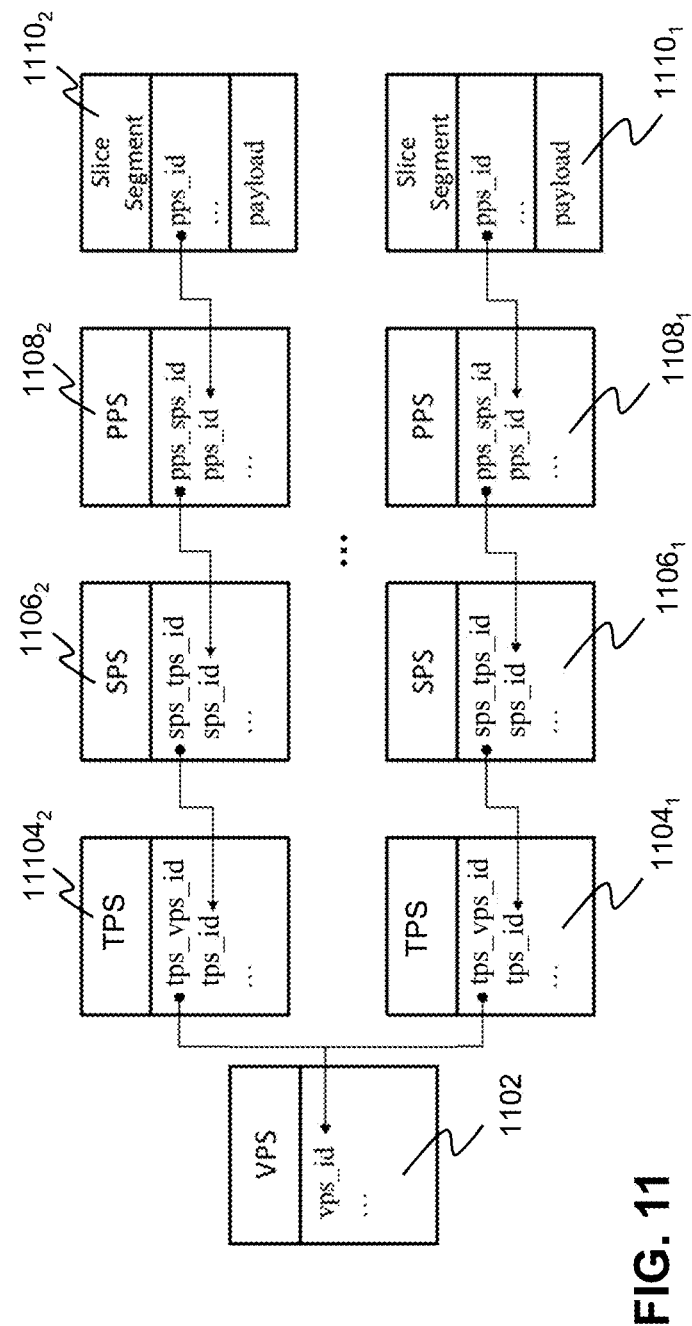
FIG. 11 depicts the relation of an TPS with other NAL units according to an embodiment of the invention.

In order to introduce the concept of tile positioning information as described with reference to FIG. 1-9, a new NAL unit, in particular a new non-VCL NAL unit, may be defined. This NAL unit may be referred to as the Tile positioning Parameter Set (TPS). FIG. 11 depicts the relation of an TPS with other NAL units, in particular the VPS and the SPS, according to an embodiment of the invention. The syntax of the Tile positioning Parameter Set is defined in table 4:

TABLE 4

Tile positioning Parameter Set syntax

|  | Descriptor |
|---|---|
| tile_positioning_parameter_set_rbsp( ) { |  |
| tps_video_parameter_set_id | u(4) |
| tps_tile_positioning_parameter_set_id | ue(v) |
| boundary_identifier_north | u(16) |
| boundary_identifier_east | u(16) |
| boundary_identifier_south | u(16) |
| boundary_identifier_west | u(16) |
| } |  |

The TPS may include one or more of the following parameters:

tps_video_parameter_set_id: VPS NAL unit id that the TPS depends on;

tps_tile_positioning_parameter_set_id: Id of this Tile positioning Parameter Set;

boundary_identifier_north: boundary identifier located at the north boundary of the tile;

boundary_identifier_east: boundary identifier located at the east boundary of the tile;

boundary_identifier_south: boundary identifier located at the south boundary of the tile;

boundary_identifier_west: boundary identifier located at the west boundary of the tile.

The TPS defined in table 4 may be associated with a rectangular video tile comprising four boundaries, wherein each boundary may be associated with boundary identifier. The boundary identifier may be associated with orientation information for signalling a decoder about the orientation of the video tile in a rectangular output video frame buffer. The TPS of table 4 is only one example of a TPS according to the invention. For example, a TPS may describe a video tile having another shape, e.g. triangular, than a conventional rectangular shape.

Hence, the TPS comprises an identifier for identifying this TPS, at least one pointer that points to one or more other non-VCL NAL units, in particular a VPS NAL unit, and a set of boundary identifier identifiers for identifying the boundaries (in this example) of a rectangular tile.

As shown in FIG. 11, each TPS $1104_{1,2}$ comprises a video tile identifier tps_id (pointing to one or more non-VCL NAL units, e.g. SPS and PPS, and one or more slice segments $1110_{1,2}$ comprising encoded media data belonging to one video tile) and one or more boundary identifiers. Further, the TPS comprises an VPS identifier tps_vps_id which links the video tile (TPS, SPS, PPS and slice segments) to a VPS (identified by a VPS_id) which is a non-VCL NAL unit defining the video tiles in an output video frame.

The one or more non-VCL NAL units of a video tile, e.g. and SPS and a PPS, may comprise further information on the video data of the video tile. For example, SPS $1106_{1,2}$ may comprise information on the colour format, bit depth and sample resolution of the video data of a tile, etc. The PPS $1108_{1,2}$ may comprise information on the picture decoding, including information on the entropy coding, etc. of the video data of a tile. The VPS may comprise general parameters for a coded video bitstream comprising a number of number of video tiles (as defined by the different TPS NAL units).

The memory size of the boundary identifiers (in the example are unsigned integer of 16 bits) may be adapted if the range of possible values are deemed to be insufficient or, on the contrary, are excessive with respect to actual need of having different unique values (see Error! Reference source not found. for other examples of boundary identifier identifiers).

In view of the TPS, the definition of the SPS may be updated according to the information in the following table 5. That is, the SPS points to a TPS and no longer to a VPS.

TABLE 5

Sequence parameter set syntax

| | Descriptor |
|---|---|
| seq_parameter_set_rbsp( ) { | |
|     sps_tile_positioning_parameter_set_id | u(4) |
|     sps_max_sub_layers_minus1 | u(3) |
|     sps_temporal_id_nesting_flag | u(1) |
|     profile_tier_level( sps_max_sub_layers_minus1 ) | |
|     sps_seq_parameter_set_id | ue(v) |
| [...] | |
|     rbsp_trailing_bits( ) | |
| } | |

As defined in the HEVC standard, each non-VCL NAL units (PPS, SPS and VPS) is initially considered not active at the start of the operation of the decoding process. In addition, the specification defines that at most one PPS, SPS and VPS are considered active at any given moment during the operation of the decoding process.

The HEVC standard specifies that when a PPS (with a particular value of pps_pic_parameter_set_id) is not active and it is referred to by a coded slice segment NAL unit (using a value of slice_pic_parameter_set_id equal to the pps_pic_parameter_set_id value), it is activated. In turns, the SPS referred by the PPS gets activated and similarly the VPS referred by the SPS gets activated too.

When a PPS, SPS or VPS is activated, it deactivates the currently activated non-VCL NAL unit of the same type when present. Therefore, for a decoder, there is only one PPS, SPS and VPS activated at all time.

In light of these rules, the use of the Tile positioning Parameter Set changes the current HEVC specification in the sense that at most one PPS and SPS is activated by the activated Tile positioning Parameter Set. There shall still be at most one VPS activated. Also, a Tile positioning Parameter Set gets activated the same way a PPS, SPS or VPS is. However, a Tile positioning Parameter Set cannot be deactivated the same way the current non-VCL NAL units are. Therefore, there may be a maximum number of active TPS defined. This value can be defined in a absolute manner or set for a profile for which the bitstream is compliant.

As shown in FIG. 11, by managing the video tiles at NAL unit level the number and/or sequence of video tiles for building an output frame (a meta-frame) can be easily manipulated. For example, bitstream representing a 6×4 tiled panorama view can be easily transformed into a smaller 4×3 central view by using the tile positioning NAL units to filter the peripheral tiles out of the bitstream.

Instead of signalling metadata at the bitstream level, e.g. a NAL unit in the form of a Tile positioning Parameter Set, a Tile positioning description message may be used. The Tile positioning description message may be defined as a Supplemental Enhancement Information (SEI) message that comprises the information that is needed for defining a tile and boundary identifiers associated with such tile. An example of a SEI message syntax is given in the table 6:

TABLE 6

Tile positioning description message syntax

| | Descriptor |
|---|---|
| Tile_positioning_description(payloadSize ) { | |
|     tile_positioning_description_sps_id | ue(v) |
|     boundary_identifier_north | u(16) |
|     boundary_identifier_east | u(16) |
|     boundary_identifier_south | u(16) |
|     boundary_identifier_west | u(16) |
| } | |

The Tile positioning Description SEI message may comprise the following parameters:

tile_positioning_description_sps_id: SPS NAL unit of the tile which in turns is associated with a PPS which in turns is associated with slice segments.

boundary_identifier_north: boundary identifier located at the north boundary of the tile;

boundary_identifier_east: boundary identifier located at the east boundary of the tile;

boundary_identifier_south: boundary identifier located at the south boundary of the tile;

boundary_identifier_west: boundary identifier located at the west boundary of the tile.

As shown in Table 6 the SEI message may (in a similar way as a TSP) comprise one or more boundary identifiers, wherein an boundary identifier may be associated with orientation information for defining an orientation of a video tile in a reference space.

This new SEI message may be of type 139 and be a prefix SEI message. Accordingly, the process of parsing SEI messages may be modified as below in the following table 7. That is, a new test statement is added in the parsing algorithm for the type 139.

TABLE 7 parsing process of Tile positioning Description SEI message

| | Descriptor |
|---|---|
| sei_payload( payloadType, payloadSize ) { | |
|   if( nal_unit_type = = PREFIX_SEI_NUT ) | |
|     if( payloadType = = 0 ) | |
|       buffering_period( payloadSize ) | |

TABLE 7-continued parsing process of Tile positioning Description SEI message

| | Descriptor |
|---|---|
| ... | |
|     else if( payloadType = = 137 ) | |
|         mastering_display_colour_volume( | |
|         payloadSize ) | |
|     else if( payloadType = = 138 ) | |
|         segmented_rect_frame_packing_arrangement( | |
|         payloadSize ) | |
|     else if( payloadType = = 139 ) | |
|         tile_description( payloadSize ) | |
|     else | |
|         reserved_sei_message( payloadSize ) | |
| else /* nal_unit_type = = SUFFIX_SEI_NUT */ | |
| ... | |
|     reserved_sei_message( payloadSize ) | |
| if( more_data_in_payload( ) ) { | |
|     if( payload_extension_present( ) ) | |
|         reserved_payload_extension_data | u(v) |
|     payload_bit_equal_to_one /* equal to 1 */ | f(1) |
|     while( !byte_aligned( ) ) | |
|         payload_bit_equal_to_zero /* equal to 0 */ | f(1) |
| } | |
| } | |

When implementing the concept of video tiles that have positions relative to each other on the basis of boundary identifiers in the bitstream (using e.g. an TIPS or a Tile Description message), a decoder needs to identify all the slices that built one meta-frame, i.e. all the video tile frames sharing the same presentation timestamp. To this end, the picture order count parameter known from the HEVC standard may be used by setting this parameter to the same value for all the slices that pertain to the same meta-frame. The picture order count parameter is an existing parameter in the HEVC standard which is an integer assigned to every frame in sequence order of a HEVC bitstream. This parameter loops from 0 to $2^{max\text{-}poc}$ where max_poc is signalled in the bitstream itself.

Additionally, the slices belonging to a same meta-frame need to be located in consecutive order in the bitstream to facilitate the decoding process and to provide lower latency of the decoding process. If slices are located far apart from each other in the bitstream, the time between the decoding of the slice and its display will indeed increase. As a consequence, the size of the output video frame buffer will also increase.

However, solely using the picture order count may have some disadvantages. When composing a bitstream from different video sources, the picture order count parameter of the bitstream originating from one video source needs to be rewritten in order to align with the one or more bitstreams originating from the one or more other video sources. Additionally, at the end of a first meta-frame and the start of a new second meta-frame, a change in consecutive picture order count parameters may occur. As a result, detecting a change in all the slices of a meta-frame requires parsing each consecutive slice in order to extract the picture order count, which increases the complexity of the bitstream assembling process.

Therefore, in an embodiment, an explicit meta-frame delimiter is used to alleviate these problems. The meta-frame delimiter may have the structure of a NAL unit that marks the start of a new meta-frame. The presence of such delimiter also implies the end of the current meta-frame (if present). This way, extraction or insertion of slices associated with a given video tile may be easily realized by only extracting these delimiters and not necessarily parsing all the slices.

Additionally, in an embodiment, a meta-frame may be identified by a meta-frame order count (similar to each picture order count). A meta-frame order count parameter may have the structure of a (new) NAL unit. This NAL unit type may have the value of 41 (taken from the reserved range of values) as specified in table 8.

TABLE 8

New NAL unit type for meta-frame delimiter

| nal_unit_type | Name of nal_unit_type | Content of NAL unit and RBSP syntax structure | NAL unit type class |
|---|---|---|---|
| 41 | RD_NUT | meta frame delimiter<br>meta_frame_delimiter_rbsp( ) | non-VCL |

The syntax of the meta-frame delimiter is provided in the following table 9:

TABLE 9 syntax of meta-frame delimiter

| | Descriptor |
|---|---|
| meta_frame_delimiter_rbsp( ) { | |
|     meta_frame_pic_order_cnt_lsb | u(v) |
|     rbsp_trailing_bits( ) | |
| } | |

Here, the parameter meta_frame_order_cnt_lsb specifies the meta-frame order count modulo MaxMetaFrameOrderCntLsb for the current meta-frame. The length of the meta_frame_pic_order_cnt_lsb syntax element is log 2_max_meta_frame_order_cnt_lsb_minus4+4 bits. The value of the meta_frame_order_cnt_lsb may be selected in the range of 0 to MaxMetaFrameOrderCntLsb−1, inclusive. This definition based on the the existing slice_pic_order_cnt_lsb parameter and adapted for a meta-frame. The parameter log 2_max_meta_frame_order_cnt_lsb_minus4 is added in the Video Parameter Set as defined in table 10:

TABLE 10 video parameter set syntax

| | Descriptor |
|---|---|
| video_parameter_set_rbsp( ) { | |
|     vps_video_parameter_set_id | u(4) |
|     [...] | |
|     log2_max_meta_frame_order_cnt_lsb_minus4 | ue(v) |
|     rbsp_trailing_bits( ) | |
| } | |

Here, the parameter log 2_max_meta_frame_order_cnt_lsb_minus4 specifies the value of the variable MaxMetaFrameOrderCntLsb that is used in the decoding process for meta-frame order count as follows:

$$MaxMetaFrameOrderCntLsb = 2^{(log\ 2\_max\_meta\_frame\_order\_cnt\_lsb\_minus4+4)}$$

The value of log 2_max_meta_frame_order_cnt_lsb_minus4 shall be in the range of 0 to 12, inclusive. This definition is based on the existing log 2_max_pic_order_cnt_lsb_minus4 and adapted for a meta-frame.

Figures 12, 13:
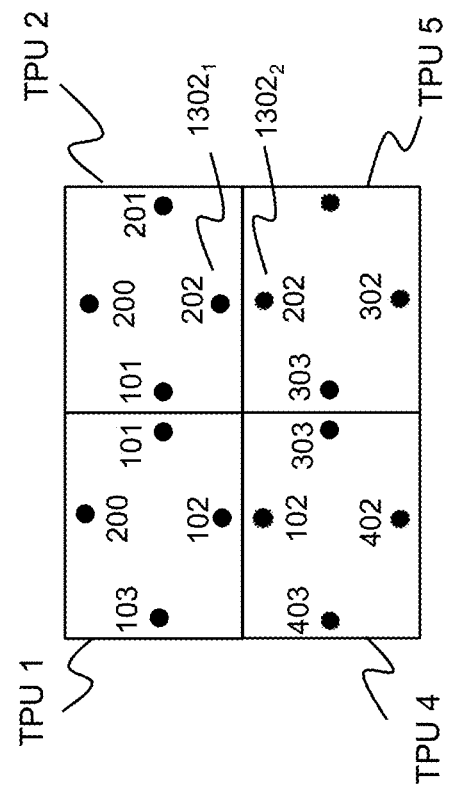
FIG. 12 depicts a data format of a tile-based bitstream according to an embodiment of the invention.
FIG. 13 depicts a manifest file for a client device according to an embodiment of the invention.

FIG. 12 depicts a data format of a tile-based bitstream according to an embodiment of the invention. As shown in FIG. 12, the bitstream may comprise non-VCL NAL units comprising e.g. the VPS, TPS, SPS and PPS non-VCL NAL units and the TPS non VCL NAL units as described with reference to FIG. 11. Additionally, the bitstream may comprise VCL NAL units comprising video data in the form of slices and meta-frame delimiters (non-VCL units) that signal the decoder slices belong to a meta-frame (i.e. a tile in the output video frame).

In order to produce a tile bitstream out of a video bitstream or merge a new tile bitstream into an existing video bitstream, the decoder or encoder should be able to easily identify the NAL units belonging to each video tile. To that end, a new nuh_tile_id parameter may be used in the header of a NAL unit. The header information nal_unit_header may be defined on the basis of the information in table 11:

TABLE 11 syntax of a NAL unit header

| | Descriptor |
|---|---|
| nal_unit_header( ) { | |
|   forbidden_zero_bit | f(1) |
|   nal_unit_type | u(6) |
|   nuh_layer_id | u(6) |
|   nuh_temporal_id_plus1 | u(3) |
|   nuh_tile_id | u(6) |
| } | |

Here, the parameter nuh_tile_id may be equal to 0 in order to identify NAL units that have no relation with the tile concept and thus must be invariant to merging and extraction operations of tile bitstreams. For instance, when extracting a given tile bistream, NAL units with nuh_tile_id equal to 0 must be copied over in the new tile bitstream. On the other end, non-zero values identify NAL units belonging to a given tile. The TPS NAL unit with the given nuh_tile_id provides properties of the given tile positioning unit (see Error! Reference source not found.). This way, all NAL unit of the HEVC bitstream can be categorized as belonging to a certain tile or not by simply parsing its header, i.e. the NAL unit header.

Further information that may be signalled in the bitstream includes the maximum number of tiles in the bitstream. This formation may be necessary for conformance and implementation of a decoder. In an embodiment, the maximum number of tiles may be signalled to the decoder as a parameter in a NAL unit, in particular as a parameter in the Video Parameter Set.

The invention may be implemented on the basis of an existing coding standard, e.g. the HEVC standard or a coding standard derived therefrom. Alternatively, it may form the basis of a new coding scheme wherein the concept of tiles and meta-frames may be implemented at a high level in the video bitstream syntax.

When implemented on the basis of the HEVC standard, the invention requires some changes (extensions) to the current HEVC standard such as the decoder architecture (e.g. multiple conventional HEVC decoding processes, one per video tile or subsets of video tiles), the creation of a SEI message tile description.

In an embodiment, the video bitstream may be stored in a suitable data container. In particular, the video data may be stored in an ISOBMFF format. The ISOBMFF (ISO/IEC 14496-12) standard defines the concept of tracks in which a media stream (i.e. audio-video data) can be stored. Hence, in an embodiment, tile bitstreams may be stored as separate tracks.

Similar to the previous embodiment, the same metadata could be transported in a MPEG-2 TS data structure.

In a further embodiment, the data formats described in this disclosure, i.e. data formats in which a tile map is defined on the basis of tile positioning units for defining the relative position of video tiles in a tiled video mosaic (as e.g. described with reference to FIGS. 2,3,8 and 9), may also be used in the context of streaming spatially tiled videos on the basis of an HTTP adaptive streaming protocol such as MPEG DASH.

Video frames of a source video file may be spatially divided in tiles according to a tiling arrangement and the video data associated with different tiles may be stored as different files on a storage medium, e.g. a server. A client may be configured to request the server to transmit (stream) video data as different tile streams to the client and to process the video data of the tile streams into output video frames for display.

A so-called manifest file may be used in order to signal a client device about the spatial relation between the different tile streams. For example, the spatial relation of a 2×2 tile mosaic formed by four (or more) tile streams can be defined in a manifest file so that the client is able to request the tile streams and to process the video data of the tile streams accordingly. In an embodiment, the manifest file may be an Media Presentation Description (MPD) as known from the ISO/IEC 23009 standard (the MPEG DASH standard).

In an embodiment, the existing Spatial Relationship Description (SRD) known from the MPEG DASH standard may be extended with a new scheme identifier describing a new coordinate system that is based on the boundary identifier scheme as described in this disclosure. This way, a DASH client may be informed on the spatial relation of the tiles in the bitstream.

In an embodiment, the SupplementalProperty and/or EssentialProperty descriptors may be used to signal the DASH client that the bitstream supports video tiles which are arranged on the the basis of boundary identifiers. In an embodiment, the @schemeIdUri may be set to "urn:mpeg:dash:srd:relative:4-connected:2016" in order to provide DASH client with relative spatial relationship information associated to the containing Spatial Object, here an AdaptationSet. The following table 12 provides an example of a syntax associated with this new scheme id.

TABLE 12 syntax of SupplementalProperty and/or EssentialProperty descriptors

| EssentialProperty@value or SupplementalProperty@value parameter | Description |
|---|---|
| source_id | non-negative integer in decimal representation providing the identifier for the source of the content |

TABLE 12-continued syntax of SupplementalProperty and/or EssentialProperty descriptors

| EssentialProperty@value or SupplementalProperty@value parameter | Description |
|---|---|
| boundary identifier_north | non-negative integer in decimal representation expressing identifier at the position North |
| boundary identifier_east | non-negative integer in decimal representation expressing boundary identifier at the position East |
| boundary identifier_south | non-negative integer in decimal representation expressing boundary identifier at the position South |
| boundary identifier_west | non-negative integer in decimal representation expressing boundary identifier at the position West |

The example as described with reference to table 12 is based on four boundary identifiers. The invention however is not limited thereto and may be easily extended to more boundary identifier, including e.g. corner boundary identifiers. The following table 13 provides an example of a MPD that is configured to signal relative position information to a DASH client:

TABLE 13 example MPD including an SRD that is based on boundary

```
<?xml version="1.0" encoding="UTF-8"?>
<MPD
  xmlns="urn:mpeg:dash:schema:mpd:2011"
  type="static"
  mediaPresentationDuration="PT10S"
  minBufferTime="PT1S"
  profiles="urn:mpeg:dash:profile:isoff-on-demand:2011">
  <Period>
  <!-- tile 1 - top left -->
  <AdaptationSet segmentAlignment="true" subsegmentAlignment="true"
subsegmentStartsWithSAP="1">
    <Role schemeIdUri="urn:mpeg:dash:role:2011" value="main"/>
    <SupplementalProperty schemeIdUri="urn:mpeg:dash:srd:relative:4-connected:2016"
value="0,100,101,102,103"/>
    <Representation mimeType="video/mp4" codecs="avc1.42c033" width="1920" height="1080"
bandwidth="1055223" startWithSAP="1">
      <BaseURL> region1.mp4</BaseURL>
      <SegmentBase indexRangeExact="true" indexRange="839-990"/>
    </Representation>
  </AdaptationSet>
  <!-- tile 2 - top right -->
  <AdaptationSet segmentAlignment="true" subsegmentAlignment="true"
subsegmentStartsWithSAP="1">
    <Role schemeIdUri="urn:mpeg:dash:role:2011" value="main"/>
    <SupplementalProperty schemeIdUri="urn:mpeg:dash:srd:relative:4-connected:2016"
value="0,200,201,202,101"/>
    <Representation mimeType="video/mp4" codecs="avc1.42c033" width="1920" height="1080"
bandwidth="1055223" startWithSAP="1">
      <BaseURL> region2.mp4</BaseURL>
      <SegmentBase indexRangeExact="true" indexRange="839-990"/>
    </Representation>
  </AdaptationSet>
  <!-- tile 3 - bottom right -->
  <AdaptationSet segmentAlignment="true" subsegmentAlignment="true"
subsegmentStartsWithSAP="1">
    <Role schemeIdUri="urn:mpeg:dash:role:2011" value="main"/>
    <SupplementalProperty schemeIdUri="urn:mpeg:dash:srd:relative:4-connected:2016"
value="0,202,301,302,303"/>
    <Representation mimeType="video/mp4" codecs="avc1.42c033" width="1920" height="1080"
bandwidth="1055223" startWithSAP="1">
      <BaseURL> region3.mp4</BaseURL>
      <SegmentBase indexRangeExact="true" indexRange="839-990"/>
    </Representation>
  </AdaptationSet>
  <!-- tile 4 - bottom left -->
  <AdaptationSet segmentAlignment="true" subsegmentAlignment="true"
subsegmentStartsWithSAP="1">
    <Role schemeIdUri="urn:mpeg:dash:role:2011" value="main"/>
    <SupplementalProperty schemeIdUri="urn:mpeg:dash:srd:relative:4-connected:2016"
value="0,102,303,402,403"/>
    <Representation mimeType="video/mp4" codecs="avc1.42c033" width="1920" height="1080"
bandwidth="1055223" startWithSAP="1">
      <BaseURL> region4.mp4</BaseURL>
      <SegmentBase indexRangeExact="true" indexRange="839-990"/>
    </Representation>
```

TABLE 13-continued example MPD including an SRD that is based on boundary

```
  </AdaptationSet>
  </Period>
</MPD>
```

The above MPD in table 13 may define a tile-map as depicted in FIG. 13. This tile map comprises four tile positioning units TPU1,TPU2,TPU4,TPU5 that are positioned with respect to each other on the basis of boundary identifiers $1302_{1,2}$. For example as shown in the MPD, a left top video tile is defined on the basis of the SRD schemeIdUri="urn:mpeg:dash:srd:relative:4-connected: 2016" value="0,200,201,202,101", which signals the DASH client that the video tile is associated with four boundary identifiers namely a north boundary id 200, east boundary id 201, south boundary id 202 and west boundary id 101 (as shown in table 12 and illustrated in FIG. 13). In this particular case, four boundary identifiers per tile positioning unit (for example TPU1 include boundary identifiers 200, 101,102,103).

As shown in FIG. 13, the 2×2 mosaic may be defined by the common boundary identifier 102 of TPU1 and TPU2, common boundary identifier 101 of TPU1 and TPU2, common boundary identifier 202 of TPU2 and TPU5 and common boundary identifier 303 of TPU4 and TPU5.

Although some boundary identifiers do not have a matching boundary identifier, they are nevertheless signalled in the MPD. Further, only three sets of matching boundary identifiers would be needed to describe this video mosaic. For instance, the boundary identifiers 202 of TPU2 and TPU5 could be removed without changing the tiled output video frame. However, if tile 5 in that case is removed then tile 4 is left unrelated with the tiles 1 and 2. As a result, the boundary identifier redundancy depicted in FIG. 13 may provide a more robust description of the tiled video mosaic and avoids the need to add more boundary identifiers at a later stage when for example the splitting of the mosaic is needed for media orchestration use cases.

Hence, the above described manifest file may be stored on non-transitory computer-readable storage media of a client device, wherein the client device is configured to process the video streams of each of the video tiles on the basis of the manifest file, wherein the manifest file comprises computer-readable data comprising a plurality of tile stream identifiers for identifying a plurality of tile streams, wherein each tile stream is associated with one or more boundary identifiers, wherein the one or more boundary identifiers of each of said tiles defined the positions of one tile relative to one or more other tiles defined in the manifest file.

The client device may use the information in the manifest file in order to request and process tile streams. In particular, a client device may use tile stream identifiers (e.g. URLs) in a manifest file to request one or more network nodes, e.g. one or more media servers, to transmit tile streams to the client device. The client device may use the SRD information in the manifest file to process the video data of the different tile streams. This processing may include the decoding of the media data of the different tile streams into video frames of the different tile stream and stitching the video frames of different tile streams (belonging to one presentation time instance) into an output video frame for display.

In some embodiments, video data may be encoded on the basis of a codec that supports spatial tiling. For example, the HEVC standard supports HEVC tiles wherein the video frames are spatially divided in a grid of tiles. These HEVC tiles are encoded such that each of the tiles can be processed by a different core of a microprocessor. The media data associated with an HEVC tile may be encoded such that they do not have any spatial decoding dependency on the media data of other tiles of the same video frame. Further, the media data associated with a tile are encoded such that they do not have any temporal decoding dependency on the media data of other tiles of earlier or future video frames. In that case, the video data of each HEVC tile may be stored as HEVC tile tracks, i.e. HEVC tile files, on a media source. These tile tracks may have a data container format based on ISO/IEC 14496-12 ISO Base Media File Format (ISOBMFF) or ISO/IEC 14496-15 Carriage of NAL unit structured video in the ISO Base Media File Format. In that case, the content processing device should comprise an HEVC client that supports tiles which can decode the requested HEVC tile streams into a single video frame.

Figure 14:
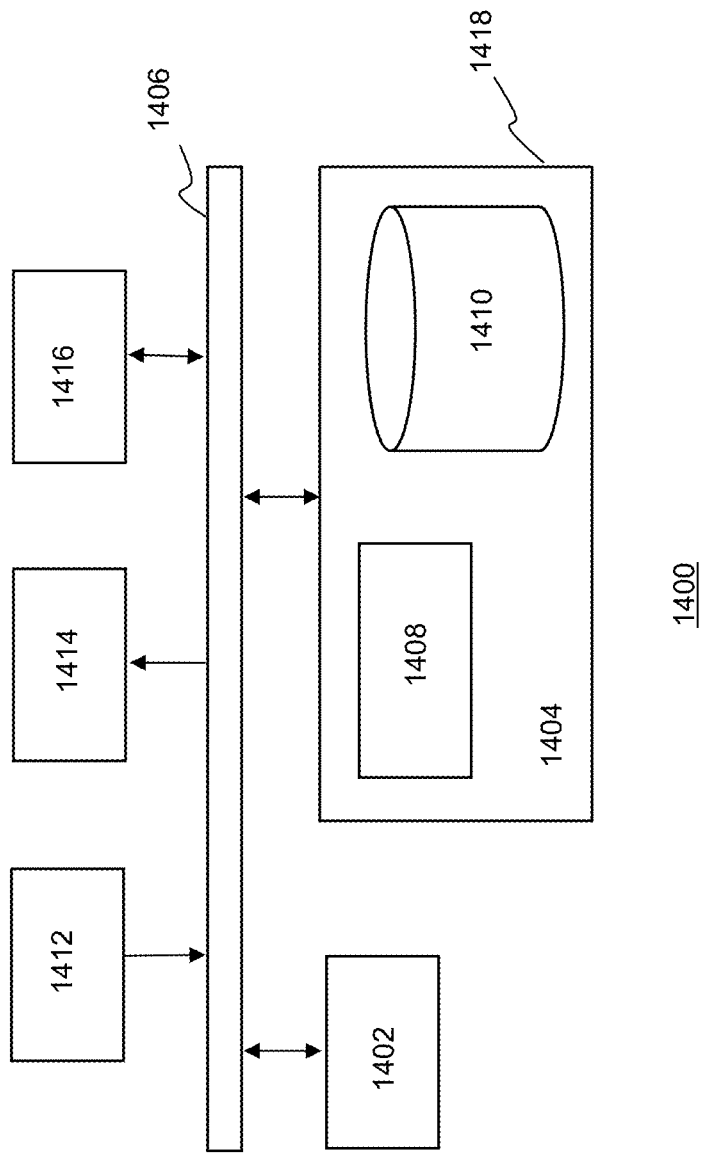
FIG. 14 depicts a block diagram illustrating an exemplary data processing system that may be used with embodiments described in this disclosure.

FIG. 14 is a block diagram illustrating an exemplary data processing system that may be used in as described in this disclosure. Data processing system 1400 may include at least one processor 1402 coupled to memory elements 1404 through a system bus 1306. As such, the data processing system may store program code within memory elements 1404. Further, processor 1402 may execute the program code accessed from memory elements 1404 via system bus 1406. In one aspect, data processing system may be implemented as a computer that is suitable for storing and/or executing program code. It should be appreciated, however, that data processing system 1300 may be implemented in the form of any system including a processor and memory that is capable of performing the functions described within this specification.

Memory elements 1404 may include one or more physical memory devices such as, for example, local memory 1408 and one or more bulk storage devices 1410. Local memory may refer to random access memory or other non-persistent memory device(s) generally used during actual execution of the program code. A bulk storage device may be implemented as a hard drive or other persistent data storage device. The processing system 1300 may also include one or more cache memories (not shown) that provide temporary storage of at least some program code in order to reduce the number of times program code must be retrieved from bulk storage device 1410 during execution.

Input/output (I/O) devices depicted as input device 1412 and output device 1414 optionally can be coupled to the data processing system. Examples of input device may include, but are not limited to, for example, a keyboard, a pointing device such as a mouse, or the like. Examples of output device may include, but are not limited to, for example, a monitor or display, speakers, or the like. Input device and/or output device may be coupled to data processing system either directly or through intervening I/O controllers. A network adapter 1416 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1450.

As pictured in FIG. 14, memory elements 1404 may store an application 1418. It should be appreciated that data processing system 1400 may further execute an operating system (not shown) that can facilitate execution of the application. Application, being implemented in the form of executable program code, can be executed by data processing system 1300, e.g., by processor 1402. Responsive to executing application, data processing system may be configured to perform one or more operations to be described herein in further detail.

In one aspect, for example, data processing system 1400 may represent a client data processing system. In that case, application 1418 may represent a client application that, when executed, configures data processing system 1400 to perform the various functions described herein with reference to a "client". Examples of a client can include, but are not limited to, a personal computer, a portable computer, a mobile phone, or the like.

In another aspect, data processing system may represent a server. For example, data processing system may represent an (HTTP) server in which case application 1418, when executed, may configure data processing system to perform (HTTP) server operations. In another aspect, data processing system may represent a module, unit or function as referred to in this specification.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A video decoding apparatus comprising:
a computer readable storage medium having computer readable program code embodied therewith, and a processor coupled to the computer readable storage medium, wherein responsive to executing the computer readable program code, the processor is configured to perform executable operations comprising:
receiving by the decoder apparatus a bitstream, the bitstream comprising a plurality of bitstream parts, each one of the bitstream parts comprising encoded media data associated with a different video tile representing a different region in an output video frame, the encoded media data of any given video tile being configured to be independently decodable, wherein the bitstream further comprises embedded tile positioning information comprising tile identifiers and boundary identifiers;
extracting, by the decoder apparatus, from the received bitstream the tile identifiers and boundary identifiers, wherein the tile identifiers include a given tile identifier identifying encoded media data belonging to a given video tile, the given tile identifier being associated with one or more of the boundary identifiers, each of the one or more boundary identifiers identifying at least one boundary of the given video tile identified by the given tile identifier,
and wherein a position of the given video tile relative to that of at least one more other given video tile is specified, without reference to coordinates of a coordinate system, by a predetermined relation between the one or more boundary identifiers of the given video tile and one or more other boundary identifiers of the at least one more other given video tile;
determining by the decoder apparatus a tile map on the basis of the tile identifiers and boundary identifiers, wherein the tile map defines a spatial layout of a plurality of video tiles of the bitstream according to relative positions of the video tiles of the plurality with respect to one another, as specified, without reference to coordinates of a coordinate system, by respective predetermined relations between respective boundary identifiers of the video tiles of the plurality;
calculating, by the decoder apparatus, a buffer size for the output video frame based on information on the video tile size of each of the plurality of tiles of the determined tile map; and
after determining the tile map, generating, by the decoder apparatus, the output video frame on the basis of decoded media data of the plurality of video tiles of the bitstream and the tile map, wherein the plurality of video tiles of the tile map have absolute positions within the output video frame.

2. The video decoding apparatus according to claim 1, wherein generating, by the video decoding apparatus, the output video frame further comprises:
the video decoding apparatus further extracting bitstream parts from the bitstream;
the video decoding apparatus providing at least a first bitstream part comprising encoded media data of at least a first video tile to a first decoder instance and at least a second bitstream part comprising encoded media of at least a second video tile to a second decoder instance, wherein the first video tile is different from the second video tile; and
the first and second decoder instances decoding at least part of the at least first bitstream part and at least part of the at least second bitstream part into decoded media data.

3. The video decoding apparatus according to claim 1, wherein the tile positioning information further comprises orientation information, the orientation information enabling a video decoding apparatus to align a predetermined boundary of the given video tile with a predetermined boundary of a rectangular reference space of the output video frame buffer.

4. The video decoding apparatus of claim 1, wherein generating the output video frame further comprises:
positioning the decoded media data in the output video frame buffer of the video decoding apparatus according to the spatial layout defined by the tile map.

5. The video decoding apparatus according to claim 1, wherein the bitstream comprises meta-frames, a meta-frame comprising a group of bitstream parts in the bitstream, the group of bitstream parts comprising encoded media data of video tiles forming a single output video frame.

6. The video decoding apparatus according to claim 5, wherein a start and/or end of a meta-frame in the bitstream is determined by the video decoding apparatus on the basis of one or more meta-frame delimiters in the bitstream, wherein a meta-frame delimiter comprises a Network Abstraction Layer unit in the bitstream.

7. The video decoding apparatus according to claim 5, wherein the start or end of a meta-frame in the bitstream is determined by the video decoding apparatus on the basis of one or more meta-frame order counters, wherein a meta-frame order counter comprises a Network Abstraction Layer unit in the bitstream.

8. The video decoding apparatus according to claim 1, wherein at least part of the tile positioning information is contained in the bitstream as one or more tile positioning units, wherein a tile positioning unit is a non-Video Coding Layer (non-VCL) Network Abstraction Layer (NAL) unit comprising a tile identifier identifying a video tile and one or more boundary identifiers for identifying one or more boundaries of the given video tile to which the tile positioning unit refers.

9. The video decoding apparatus according to claim 8, wherein determining the tile map comprises extracting tile positioning information of video tiles forming a single output video frame from the bitstream and identify neighboring video tiles on the basis of boundary identifiers in the extracted tile positioning information.

10. The video decoding apparatus according to claim 8, wherein the one or more tile positioning units are configured for enabling a decoder instance to determine one or more further NAL units in the bitstream, the one or more further NAL units being Video Coding Layer NAL units and comprising encoded media data of one or more video tiles.

11. The video decoding apparatus according to claim 1, wherein: (i) the bitstream is formatted as an HEVC bitstream or an extension thereof; and/or (ii) at least part of the tile positioning information is contained in one or more Supplemental Enhancement Information (SEI) messages, the one or more SEI messages comprising one or more tile identifiers and/or one or more boundary identifiers.

12. The video decoding apparatus according to claim 1, wherein generating, by the video decoding apparatus, the output video frame comprises:
allocating a first buffer space in an output video frame buffer, the first buffer space configured for storing decoded media data of a first video tile; and
allocating a second buffer space neighboring the first buffer space in the output video frame buffer for storing decoded media data of a second video tile,
wherein positions of the first and second buffer space are determined on the basis of the tile positioning information.

* * * * *